(12) United States Patent
Paul et al.

(10) Patent No.: US 11,972,070 B1
(45) Date of Patent: Apr. 30, 2024

(54) NOISE MITIGATION TECHNIQUES FOR TOUCH SCREEN IN PROXIMITY TO WIRELESS COMMUNICATION CIRCUITRY

(71) Applicant: Apple Inc., Cupertino, CA (US)

(72) Inventors: William Paul, San Francisco, CA (US); Christoph H. Krah, Cupertino, CA (US); Stanley B. Wang, Cupertino, CA (US); Yongjie Jiang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/933,068

(22) Filed: Sep. 16, 2022

Related U.S. Application Data

(60) Provisional application No. 63/261,606, filed on Sep. 24, 2021.

(51) Int. Cl.
  *G06F 3/041* (2006.01)
(52) U.S. Cl.
  CPC ........ *G06F 3/0412* (2013.01); *G06F 3/04164* (2019.05)
(58) Field of Classification Search
  CPC ............................. G06F 3/0412; G06F 3/04164
  See application file for complete search history.

(56) References Cited

U.S. PATENT DOCUMENTS

| | | | |
|---|---|---|---|
| 9,997,102 B2 | 6/2018 | Rotzoll et al. | |
| 2010/0201275 A1* | 8/2010 | Cok | G06F 3/04182 315/158 |
| 2017/0068362 A1* | 3/2017 | Den Boer | H01L 25/0753 |
| 2019/0206798 A1 | 7/2019 | Collins et al. | |
| 2020/0075521 A1 | 3/2020 | Elsherbini et al. | |
| 2020/0136906 A1 | 4/2020 | Guim Bernat et al. | |

* cited by examiner

*Primary Examiner* — Peter D McLoone
(74) *Attorney, Agent, or Firm* — Kubota & Basol LLP

(57) ABSTRACT

Mitigation techniques can be used to reduce noise generated by wireless communication circuitry (e.g., near-field communication circuitry) in an electronic device including a display, touch, and wireless communication circuitry. In some examples, a touch screen can have a backplane including a mesh of routing traces connected to an array of chiplets. In some examples, the chiplets can repeat signals to prevent the accumulation of noise induced by an NFC coil. In some examples, the ratio between vertical and horizontal resistances of routing traces can be configured to mitigate noise induced by the coil. In some examples, the routing traces of the mesh can be configured to share a common geometric centroid. In some examples, a plurality of routing traces can be routed in a twisted pair configuration. In some examples, the routing traces and chiplets can be routed to minimize traversal through regions of relatively high electromagnetic field.

21 Claims, 13 Drawing Sheets

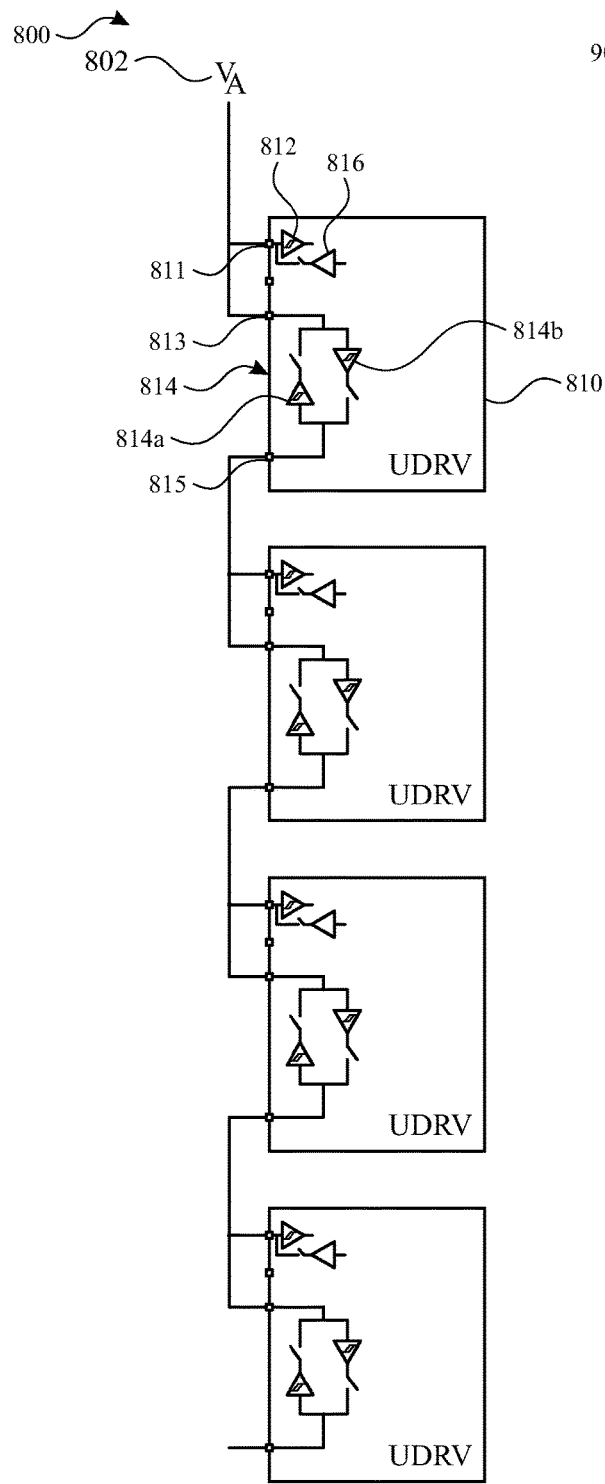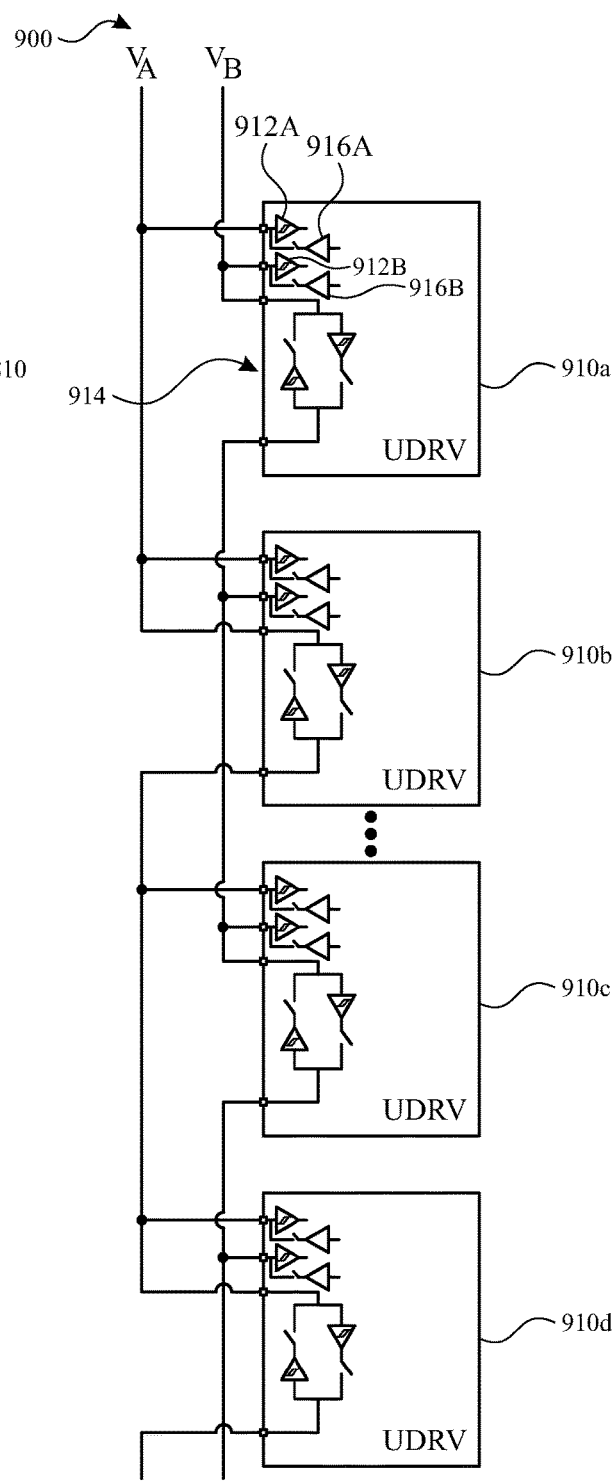
*FIG. 8*  *FIG. 9*

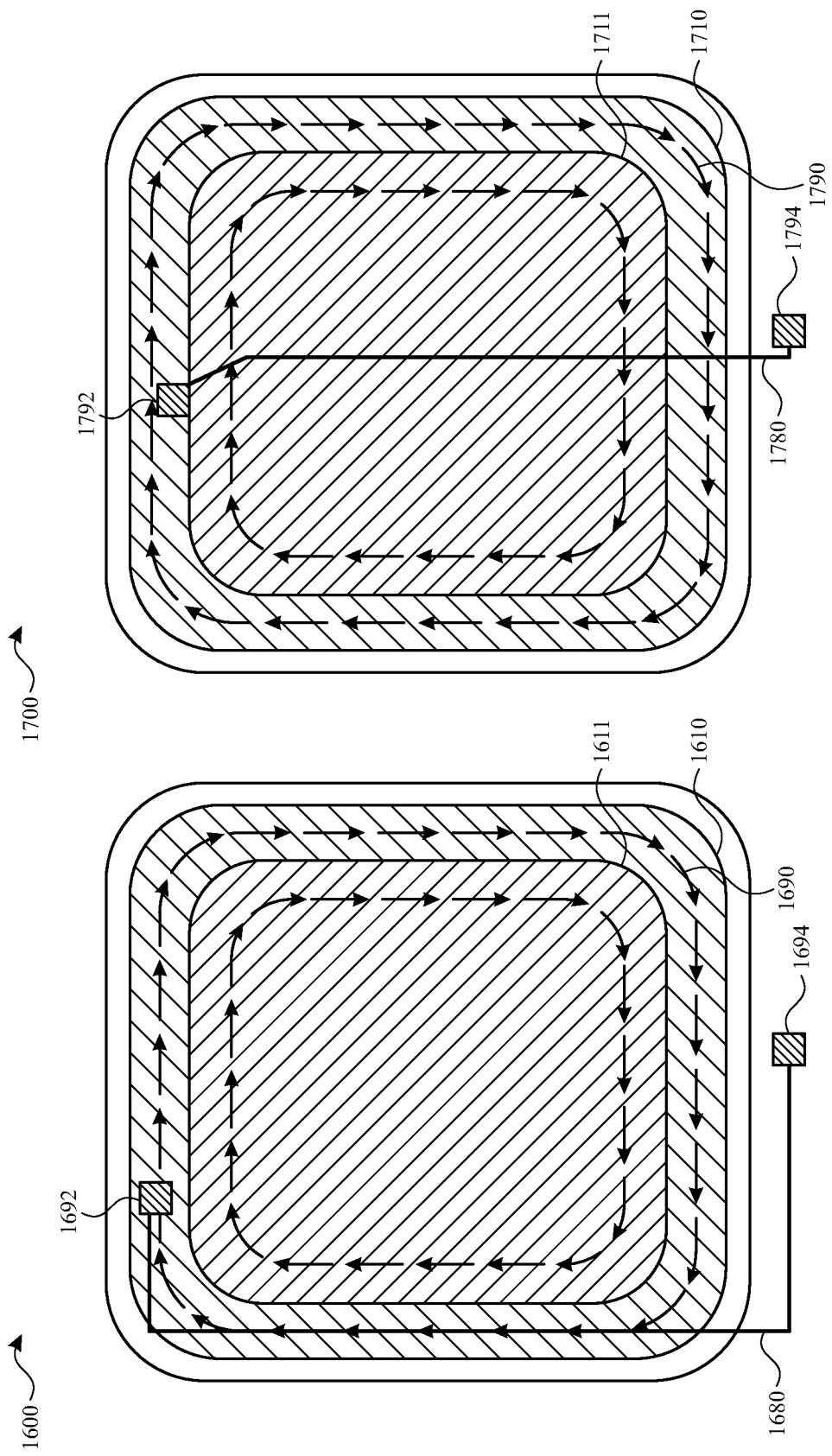

NOISE MITIGATION TECHNIQUES FOR TOUCH SCREEN IN PROXIMITY TO WIRELESS COMMUNICATION CIRCUITRY

CROSS-REFERENCE TO RELATED APPLICATIONS

This application claims the benefit of U.S. Provisional Application No. 63/261,606, filed Sep. 24, 2021, the content of which is incorporated herein by reference in its entirety for all purposes.

FIELD OF THE DISCLOSURE

This relates generally to noise mitigation techniques for an electronic device including a display and touch and/or proximity sensing, and more particularly to a chiplet architecture and method for preserving signal integrity of analog and digital signals and/or reducing interference between capacitive touch sensing systems and/or display systems and a near-field communication systems of an electronic device.

BACKGROUND OF THE DISCLOSURE

Many electronic devices include a touch sensor panel, a display, and/or a touch screen. Some of these devices also include wireless communication circuitry (e.g., near-field communication (NFC) circuitry) in proximity to the touch sensor panel, display, and/or touch screen. The operation of the wireless communication circuitry can cause noise that degrades the performance of the touch sensor panel, display, and/or touch screen.

SUMMARY OF THE DISCLOSURE

This relates generally to electronic devices and methods of operating the devices including touch, display and near-field communication (NFC) circuitry (or other wireless communication circuitry), and more particularly to methods of mitigating noise generated by NFC circuitry. An electronic device can include a touch screen (e.g., light emitting diodes, touch and/or display chiplets, etc.) and NFC circuitry including a coil. In some examples, the touch screen can have a backplane including a mesh of routing traces for routing signals to the chiplets, which can be arranged in columns and rows.

In some examples, the chiplets can be configured to repeat signals as the signals travel across the backplane (and thereby reduce the routing trace length) to prevent the accumulation of noise induced by the coil. In some examples, the backplane can comprise one or more electrically separate sub-panels. In some examples, the routing (e.g., particularly a backbone column, referring to a partition of a panel containing relatively long signal traces) can be placed in a region with relatively weak interference from electromagnetic fields, and thereafter routed to rows of chiplets in regions with relatively weak electromagnetic fields. In some examples, the chiplets can be configured to repeat a signal for each chiplet in a column (or row). In some examples, the chiplets can be configured to repeat one or more signals using alternating chiplets or using a pattern such that two chiplets repeating the signal may be separated by one or more intervening chiplets.

In some examples, the ratio between vertical and horizontal resistances of a portion of the mesh of routing traces can be configured to mitigate noise induced by the coil. In some examples, the routing traces of the mesh can be configured to share a common geometric centroid. In some examples, a plurality of routing traces can be routed in a twisted pair configuration (e.g., to cancel open loop area). In some examples, routing traces of the backplane can be arranged symmetrically around a center of a column and/or row of chiplets. In some examples, the routing traces can be routed to minimize traversal through regions of relatively high electromagnetic field and/or regions wherein the direction of the routing traces are orthogonal, or nearly orthogonal to, the orientation of the induced electric field in the backplane mesh.

BRIEF DESCRIPTION OF THE DRAWINGS

FIG. 8 illustrates an example configuration of a plurality of chiplets configured to reduce noise of a backplane according to examples of the disclosure.

FIG. 9 illustrates an example configuration of a plurality of chiplets configured to reduce noise of a backplane according to examples of the disclosure.

FIGS. 16 and 17 illustrate example routing configurations for components according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to electronic devices and methods of operating the devices including touch, display and near-field communication (NFC) circuitry (or other wireless communication circuitry), and more particularly to methods of mitigating noise generated by NFC circuitry. An electronic device can include a touch screen (e.g., light emitting diodes, touch and/or display chiplets, etc.) and NFC circuitry including a coil. In some examples, the touch screen can have a backplane including a mesh of routing traces for routing signals to the chiplets, which can be arranged in columns and rows.

In some examples, the chiplets can be configured to repeat signals as the signals travel across the backplane (and thereby reduce the routing trace length) to prevent the accumulation of noise induced by the coil. In some examples, the backplane can comprise one or more electrically separate sub-panels. In some examples, the routing (e.g., particularly a backbone column, referring to a partition of a panel containing relatively long signal traces) can be placed in a region with relatively weak interference from electromagnetic fields, and thereafter routed to rows of chiplets in regions with relatively weak electromagnetic fields. In some examples, the chiplets can be configured to repeat a signal for each chiplet in a column (or row). In some examples, the chiplets can be configured to repeat one or more signals using alternating chiplets or using a pattern such that two chiplets repeating the signal may be separated by one or more intervening chiplets.

In some examples, the ratio between vertical and horizontal resistances of a portion of the mesh of routing traces can be configured to mitigate noise induced by the coil. In some examples, the routing traces of the mesh can be configured to share a common geometric centroid. In some examples, a plurality of routing traces can be routed in a twisted pair configuration (e.g., to cancel open loop area). In some examples, routing traces of the backplane can be arranged symmetrically around a center of a column and/or row of chiplets. In some examples, the routing traces can be routed to minimize traversal through regions of relatively high electromagnetic field and/or regions wherein the direction of the routing traces are orthogonal, or nearly orthogonal to, the orientation of the induced electric field in the backplane circuit.

Figure 1A:
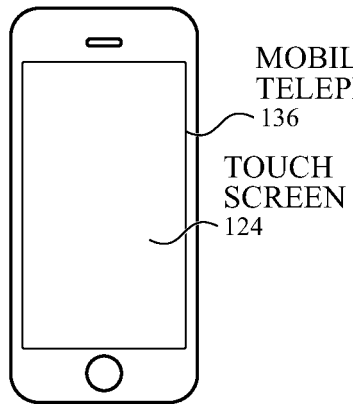
FIGS. 1A-1E illustrate example systems including integrated touch screens according to examples of the disclosure.
Figure 1B:
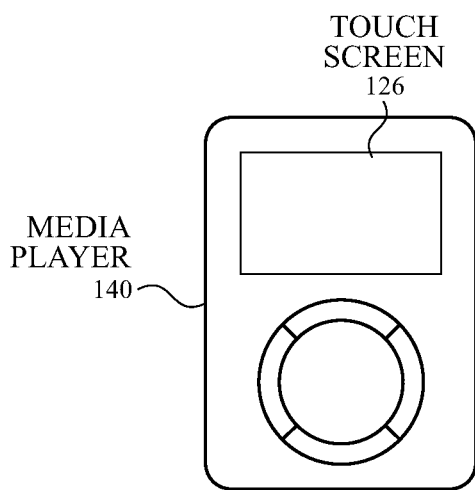
Figure 1C:
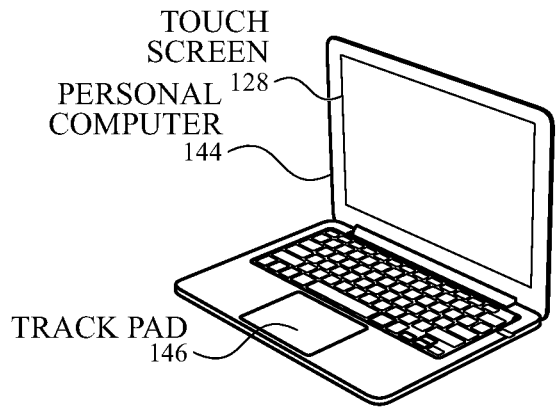
Figure 1D:
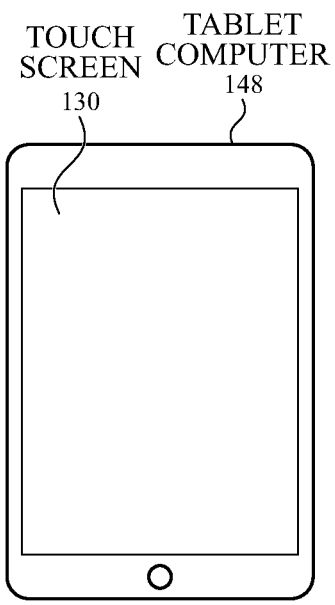
Figure 1E:
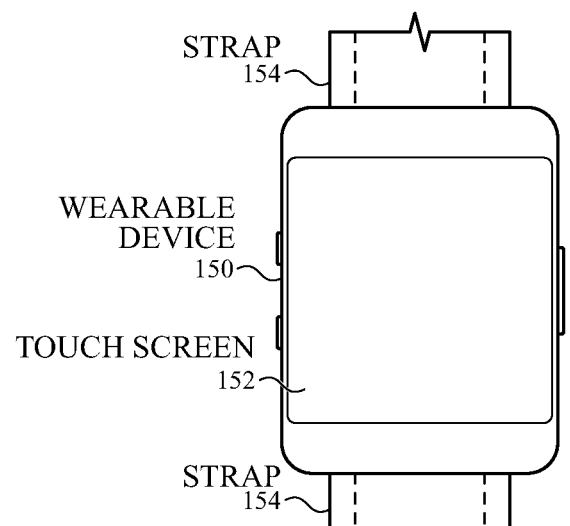

FIGS. 1A-1E illustrate example systems in which an integrated touch screen according to examples of the disclosure may be implemented. FIG. 1A illustrates an example mobile telephone 136 that includes an integrated touch screen 124. FIG. 1B illustrates an example digital media player 140 that includes an integrated touch screen 126. FIG. 1C illustrates an example personal computer 144 that includes a trackpad 146 and an integrated touch screen 128. FIG. 1D illustrates an example tablet computer 148 that includes an integrated touch screen 130. FIG. 1E illustrates an example wearable device 150 (e.g., a watch) that includes an integrated touch screen 152. It is understood that the above integrated touch screens can be implemented in other devices as well. Additionally, it should be understood that although the disclosure herein primarily focuses on integrated touch screens, some of the disclosure is also applicable to touch sensor panels without a corresponding display and displays without a corresponding touch sensor. Although not illustrated in FIGS. 1A-1E, it is understood that the example systems can also include near-field communication (NFC) circuitry. The NFC circuitry can be disposed below the touch screen, around the touch screen, and/or be integrated with the touch screen.

In some examples, touch screens 124, 126, 128, 130 and 152 can be based on self-capacitance. A self-capacitance based touch system can include a matrix of small, individual plates of conductive material or groups of individual plates of conductive material forming larger conductive regions that can be referred to as touch node electrodes. For example, a touch screen can include a plurality of individual touch node electrodes, each touch node electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 152 can be based on mutual capacitance. A mutual capacitance based touch system can include electrodes arranged as drive and sense lines that may cross over each other on different layers or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128 and 130 can be based on mutual capacitance and/or self-capacitance. The electrodes can be arranged as a matrix of small, individual plates of conductive material or as drive lines and sense lines, or in another pattern. The electrodes can be configurable for mutual capacitance or self-capacitance sensing or a combination of mutual and self-capacitance sensing. For example, in one mode of operation, electrodes can be configured to sense mutual capacitance between electrodes, and in a different mode of operation, electrodes can be configured to sense self-capacitance of electrodes. In some examples, some of the electrodes can be configured to sense mutual capacitance therebetween and some of the electrodes can be configured to sense self-capacitance thereof.

Figure 2A:
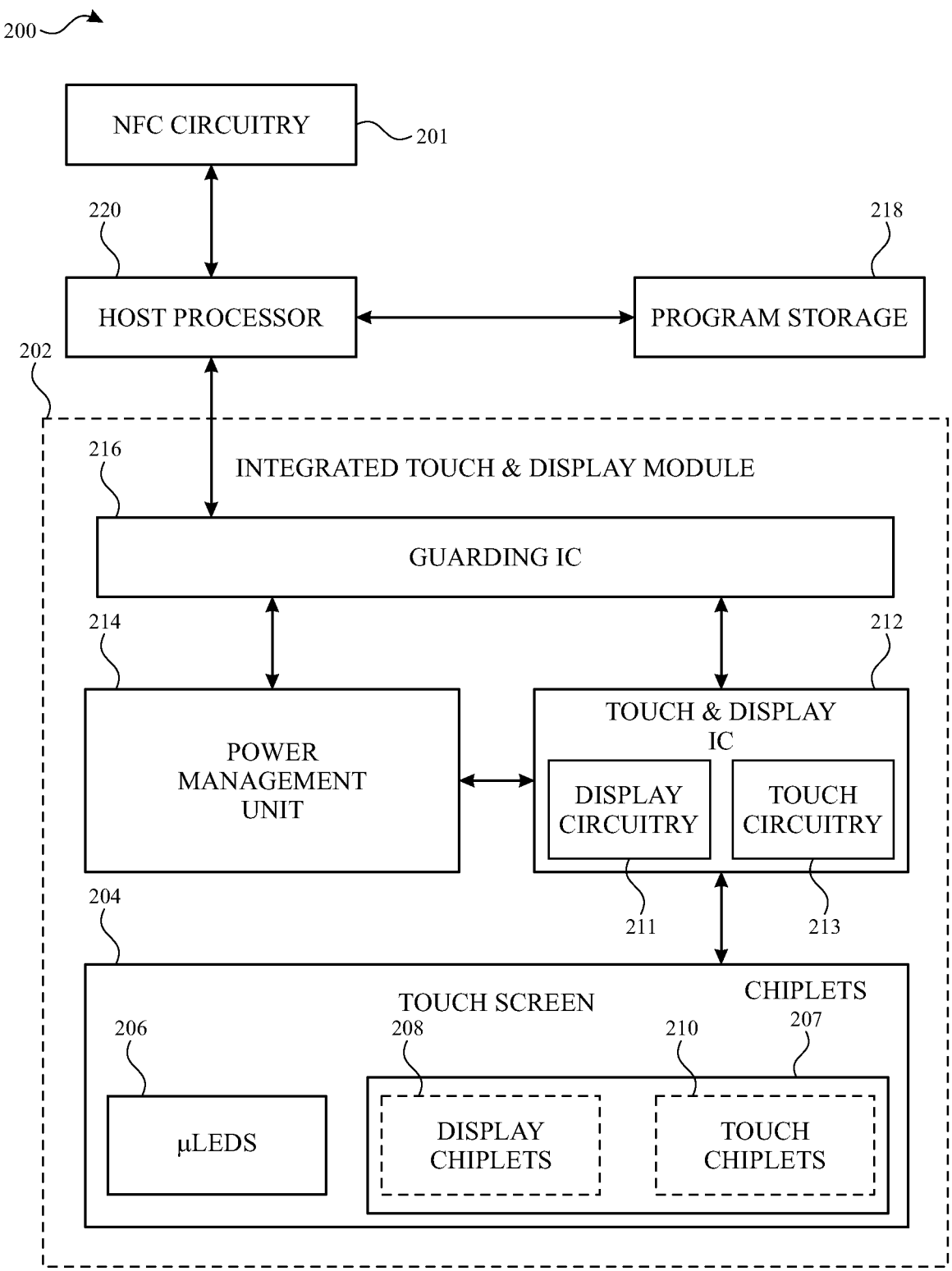
FIG. 2A illustrates a block diagram of an example integrated touch screen according to examples of the disclosure.

FIG. 2A is a block diagram of an example computing system 200 that illustrates one implementation of an example integrated touch screen 204 according to examples of the disclosure. As described in more detail herein, the integrated touch screen 204 can include light emitting diodes (LEDs) or organic light emitting diodes (OLEDs) represented by micro-LEDs 206 and chiplets 207 (e.g., integrated chiplets including LED/OLED drivers and touch sensing circuitry). In some examples, the functionality of chiplets can be divided into separate display chiplets 208 (e.g., including LED/OLED drivers) and touch chiplets 210 (e.g., including touch sensing circuitry). Chiplets may alternatively be referred to herein as micro-drivers and/or micro-driver chiplets. Computing system 200 can be included in, for example, mobile telephone 136, digital media player 140, personal computer 144, tablet computer 148, wearable device 150 or any mobile or non-mobile computing device that includes a touch screen. Computing system 200 can include integrated touch and display module 202, host processor 220, NFC circuitry 201 and program storage 218. Integrated touch and display module 202 can include integrated touch screen 204 and integrated circuits for operation of integrated touch screen 204. In some examples, integrated touch and display module 202 can be formed on a single substrate with micro-LEDs 206 and chiplets 207 (or display chiplets 208 and/or touch chiplets 210) of integrated touch screen 204 on one side of the touch screen and integrated circuits controlling operation of micro-LEDs 206 and chiplets 207 mounted on an opposite side of the single substrate. Forming integrated touch and display module 202 in this way can provide for simplified manufacturing and assembly of devices with a touch screen. In some examples, the integrated touch and display module 202 can be formed on a single substrate with micro-LEDs 206 on one side of the substrate and chiplets 207 (or display chiplets 208 and/or touch chiplets 210) of integrated touch screen 204 and integrated circuits controlling operation of micro-LEDs 206 and chiplets 207 mounted on an opposite side of the single substrate.

Integrated circuits for operation of integrated touch screen 204 can include an integrated touch and display integrated circuit (touch and display controller) 212, a power management unit (PMU) 214, and optionally a guard integrated circuit (guard IC) 216. As described in more detail herein, self-capacitance touch sensing performance can be improved (and parasitic capacitance effects reduced) by performing touch sensing operations in a different power domain than in the chassis power domain. In some examples, guard IC 216 can be used to operate integrated touch and display module 202 in a guard power domain during guarded touch operation and operate touch and display module 202 in the chassis power domain otherwise (e.g., during non-guarded touch operations or during display operations). Power management unit 214 can be an integrated circuit configured to provide the voltages necessary for the touch and display controller 212, including guard-referenced power supplies when operating in a guarded power domain. The touch and display controller 212 can include circuitry to perform touch sensing and display operations. Although illustrated in FIG. 2A as a single integrated circuit, the various components and/or functionality of the touch and display controller 212 can be implemented with multiple circuits, elements, chips, and/or discrete components (e.g., a separate touch integrated circuit and a separate display integrated circuit with an integrated circuit to handle the handoff between the two).

The touch and display controller 212 can include display circuitry 211 to perform display operations. Display circuitry 211 can include hardware to process one or more still images and/or one or more video sequences for display on integrated touch screen 204. The display circuitry 211 can be configured to generate read memory operations to read the data representing the frame/video sequence from a memory (not shown) through a memory controller (not shown), for example, or can receive the data representing the frame/video sequence from host processor 220. The display circuitry 211 can be configured to perform various processing on the image data (e.g., still images, video sequences, etc.). In some examples, the display circuitry 211 can be configured to scale still images and to dither, scale and/or perform color space conversion on the frames of a video sequence. Display circuitry 211 can be configured to blend the still image frames and the video sequence frames to produce output frames for display. The display circuitry 211 can also be more generally referred to as a display controller, display pipe, display control unit, or display pipeline. The display control unit can be generally any hardware and/or firmware configured to prepare a frame for display from one or more sources (e.g., still images and/or video sequences). More particularly, the display circuitry 211 can be configured to retrieve source frames from one or more source buffers stored in memory, composite frames from the source buffers, and display the resulting frames on integrated touch screen 204. Accordingly, the display circuitry 211 can be configured to read one or more source buffers and composite the image data to generate the output frame. Display circuitry 211 can provide various control and data signals to the display, via chiplets 207 (or via display chiplets 208), including timing signals (e.g., one or more clock signals) and pixel selection signals. The timing signals can include a pixel clock that can indicate transmission of a pixel. The data signals can include color signals (e.g., red, green, blue) for micro-LEDs 206. The display circuitry can control integrated touch screen 204 in real-time, providing the data indicating the pixels to be displayed as the touch screen is displaying the image indicated by the frame. The interface to such an integrated touch screen 204 can be, for example, a video graphics array (VGA) interface, a high definition multimedia interface (HDMI), a mobile industry processor interface (MIPI), a digital video interface (DVI), a LCD/LED/OLED interface, a plasma interface, or any other suitable interface.

The touch and display controller 212 can include touch circuitry 213 to perform touch operations. Touch circuitry 213 can include one or more touch processors, peripherals (e.g., random access memory (RAM) or other types of memory or storage, watchdog timers and the like), and a touch controller. The touch controller can include, but is not limited to, channel scan logic (e.g., implemented in programmable logic circuits or as discrete logic circuits) which can provide configuration and control for touch sensing operations by chiplets 207 (or by touch chiplets 210). For example, touch chiplets 210 can be configured to drive, sense and/or ground touch node electrodes depending on the mode of touch sensing operations. The mode of touch sensing can, in some examples, be determined by a scan plan stored in memory (e.g., RAM) in touch circuitry 213. The scan plan can provide a sequence of scan events to perform during a frame. The scan plan can also include information necessary for providing control signals to and programming chiplets 207 for the specific scan event to be performed, and for analyzing data from chiplets 207 according to the specific scan event to be performed. The scan events can include, but are not limited to, a mutual capacitance scan, a self-capacitance scan, a stylus scan, touch spectral analysis scan, and a stylus spectral analysis scan. The channel scan logic or other circuitry in touch circuitry 213 can provide the stimulation signals at various frequencies and phases that can be selectively applied to the touch node electrodes of integrated touch screen 204 or used for demodulation, as described in more detail below. The touch circuitry 213 can also receive touch data from the chiplets 207 (or touch chiplets 210), store touch data in memory (e.g., RAM), and/or process touch data (e.g., by one or more touch processors or touch controller) to determine locations of touch and/or clean operating frequencies for touch sensing operations (e.g., spectral analysis).

Integrated touch screen 204 can be used to derive touch data at multiple discrete locations of the touch screen, referred to herein as touch nodes. For example, integrated touch screen 204 can include touch sensing circuitry that can include a capacitive sensing medium having a plurality of electrically isolated touch node electrodes. Touch node electrodes can be coupled to chiplets 207 (or touch chiplets 210) for touch sensing by sensing channel circuitry. As used herein, an electrical component "coupled to" or "connected to" another electrical component encompasses a direct or indirect connection providing electrical path for communication or operation between the coupled components. Thus, for example, touch node electrodes of integrated touch screen 204 may be directly connected to chiplets 207 or indirectly connected to chiplets 207 (e.g., connected to touch chiplets 210 via display chiplets 208), but in either case provided an electrical path for driving and/or sensing the touch node electrodes. Labeling the conductive plates (or groups of conductive plates) used to detect touch as touch node electrodes corresponding to touch nodes (discrete locations of the touch screen) can be particularly useful when integrated touch screen 204 is viewed as capturing an "image" of touch (or "touch image"). The touch image can be a two-dimensional representation of values indicating an amount of touch detected at each touch node electrode corresponding to a touch node in integrated touch screen 204. The pattern of touch nodes at which a touch occurred can be thought of as a touch image (e.g., a pattern of fingers touching the touch screen). In such examples, each touch node electrode in a pixelated touch screen can be sensed for the corresponding touch node represented in the touch image.

Host processor 220 can be operatively coupled to NFC circuitry 201 to transmit and receive NFC signals to or from another device with NFC circuitry. NFC circuitry 201 can be configured to couple to electromagnetic (EM) fields. In some examples, the NFC circuitry can include an NFC antenna (e.g., a metal coil, optionally including a magnetic core, ferromagnetic, etc.). NFC circuitry 201 can further include circuitry configured to drive the metal coil. For example, one or more power sources and a plurality of switches (e.g., solid state and/or mechanical switches) can be controlled by host processor 220 to control power supplied to the metal coil. NFC circuitry 201 can also include circuitry matching circuitry to optimize impedance matching between the drive circuitry and the coil in order to optimize power transfer from the one or more power sources. In addition, filtering elements including, but not limited to LC filters and packaged filters can be included as part of the NFC circuitry 201. In some examples, a balun can be coupled to the coil. In some examples, NFC circuitry 201 can include components (e.g., passive components) coupled to the coil and configured to resonate at a known frequency. Some or all of NFC circuitry 201 (e.g., coil, switches, matching circuitry and/or balun) can be configured to both transmit and receive EM fields and/or signals. Additionally or alternatively, some or all of the NFC circuitry 201 can be configured to strictly receive EM fields (or transmit EM fields). In some examples, NFC circuitry 201 can be integrated partially or entirely with the touch and display circuitry. For example, NFC circuitry 201 can be included in the integrated touch screen 204. Additionally or alternatively, NFC circuitry 201 can be disposed in proximity with the touch screen 204 (e.g., with the coil below touch screen 204 or circumscribing touch screen 204).

Host processor 220 can be connected to program storage 218 to execute instructions stored in program storage 218 (e.g., a non-transitory computer-readable storage medium). Host processor 220 can provide, for example, control and data signals so that touch and display controller 212 can generate a display image on integrated touch screen 204, such as a display image of a user interface (UI). Host processor 220 can also receive outputs from touch and display controller 212 (e.g., touch inputs from the one or more touch processors, etc.) and performing actions based on the outputs. The touch input can be used by computer programs stored in program storage 218 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 220 can also perform additional functions that may not be related to touch processing and display.

Note that one or more of the functions described herein, including the configuration and operation of chiplets, can be performed by firmware stored in memory (e.g., one of the peripherals in touch and display controller 212) and executed by one or more processors (in touch and display controller 212), or stored in program storage 218 and executed by host processor 220. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system 200 is not limited to the components and configuration of FIG. 2A, but can include other or additional components in multiple configurations according to various examples. Additionally, the components of computing system 200 can be included within a single device or can be distributed between multiple devices. In some examples, PMU 214 and guard IC 216 can be integrated into a power management and guard integrated circuit. In some examples, the power management and guard integrated circuit can provide power supplies (e.g., guard referenced) and the guard signal to touch screen 204 directly rather than via touch and display IC 212. In some examples, touch and display IC 212 can be coupled to host processor 220 directly, and a portion of touch and display IC 212 in communication with chiplets 207 can be included in an isolation well (e.g., a deep N-well isolation) referenced to the guard signal from guard IC 216.

As described herein, in some examples integrated touch and display module 202 can perform touch sensing operations (e.g., self-capacitance scans) in a different power domain than in the chassis power domain. In some examples, integrated touch and display module 202 can perform non-guarded touch sensing operations (e.g., mutual capacitance scans) or display operations in the chassis power domain.

Figure 2B:
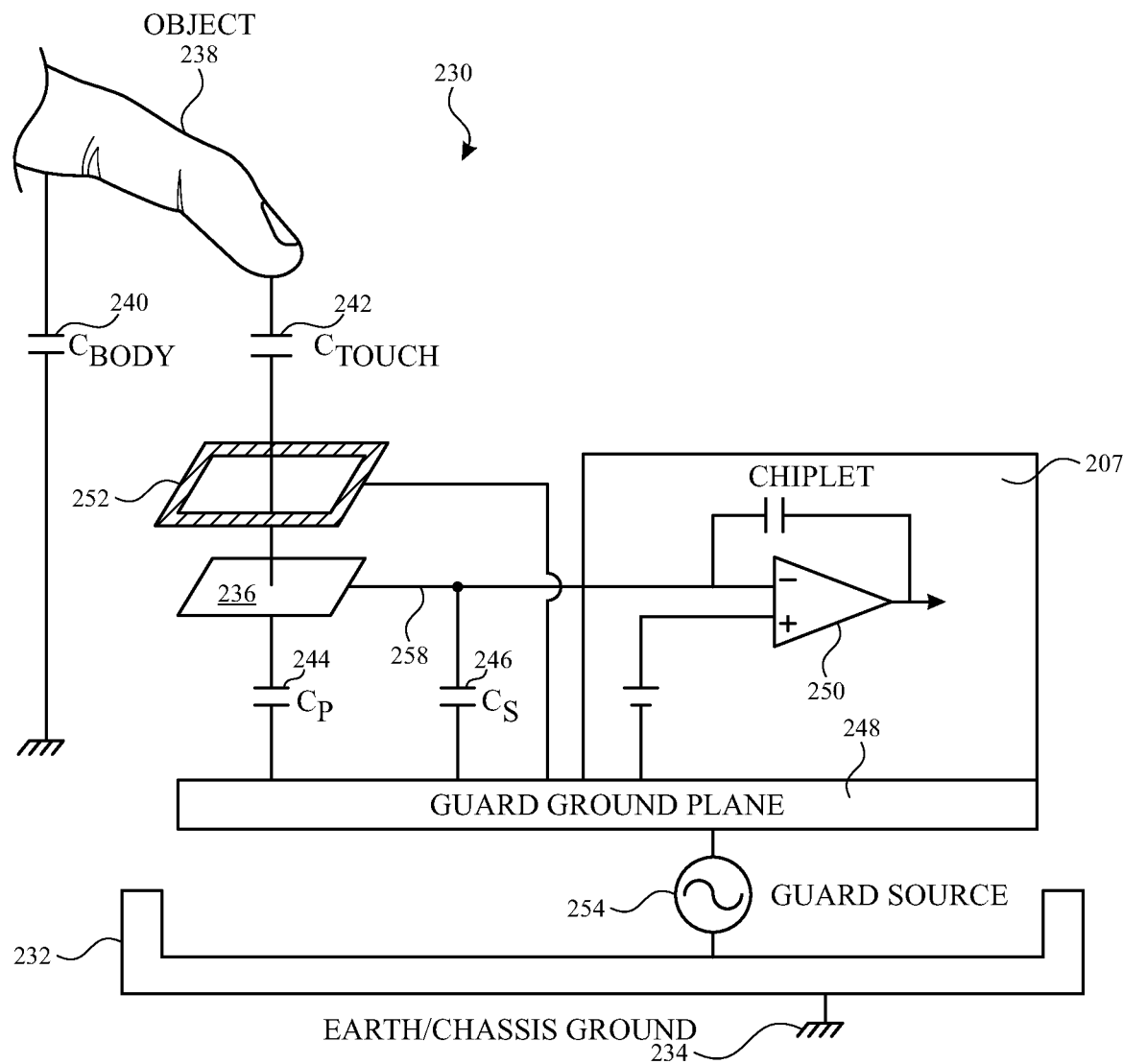
FIG. 2B illustrates an example touch sensing configuration according to examples of the disclosure.

FIG. 2B illustrates an example touch sensing configuration 230 including various associated capacitances according to examples of the disclosure. In configuration 230 of FIG. 2B, the touch sensing circuitry of integrated touch screen 204 can be referenced to a guard ground rather than a chassis ground. Specifically, in configuration 230 of FIG. 2B, touch sensing circuitry (e.g., sense amplifier 250) in chiplet 207 (or touch chiplet 210) can be coupled to a touch node electrode 236 by a routing trace 258. Chiplet 207 can be disposed or fabricated on a substrate including a guard ground plane 248 ("guard plane"), which can represent a virtual ground plane of touch chiplet 210 that is different from chassis ground 234 (also referred to herein as earth ground or device ground). In particular, stimulation source 254 ("guard source") disposed in guard IC 216, for example, can be referenced to chassis ground 234, and can output a guard voltage (e.g., a guard stimulation signal, such as a square or trapezoid wave) that can establish the voltage at guard plane 248. In this manner, the guard plane 248, acting as a guard ground for chiplet 207, can be at the guard voltage. Because chiplet 207 can be mounted on a substrate including guard plane 248, the sense amplifier in chiplet 207 can be referenced to the guard signal (and receive other guard-referenced voltages produced by PMU 214, for example), and can be isolated from chassis ground 234 by guard plane 248. In this way, chiplet 207 (or touch chiplet 210) can operate in the guard power domain, whereas the guard source 254 (e.g., in guard IC 216) can operate in the chassis power domain. Guard plane 248 can be any conductive material of a substrate on which chiplet 207 can be disposed or fabricated (e.g., silver, copper, gold, etc.). For example, chiplet 207 may be assembled on a printed circuit board (PCB) and may be referenced to the PCB guard plane 248 (or PCB ground layer) driven, during guarded self-capacitance scans, by guard source 254. Guard source 254 can be implemented, for example, using a waveform generator (e.g., generating arbitrary waveforms, such as a square wave referenced to chassis ground 234) whose output can be inputted in to a digital-to-analog converter (DAC). Analog output from the DAC can be provided to a linear buffer (e.g., with unity or some other gain) whose output can correspond to the output of guard source 254.

Additionally, guard plane 248 can be disposed between touch node electrode 236 and chassis 232 (or, more generally, chassis ground 234), and guard plane 248 can be disposed between a routing trace 258 that couples touch node electrode 236 to chiplet 207 and chassis 232 (or, more generally, chassis ground 234). Thus, guard plane 248 can similarly isolate touch node electrode 236 and routing trace 258 that couples touch node electrode 236 to chiplet 207 from chassis ground 234. Guard plane 248 can reduce or eliminate parasitic or stray capacitances that may exist between touch node electrode 236 and chassis ground 234, as will be described below. Optionally, a guard plane can be included in a layer above the touch node electrodes and/or between touch node electrodes (e.g., as illustrated by guard plane 252) and can be referenced to the same guard voltage. Guard plane 252 can include openings corresponding to touch node electrodes to enable detection of touch activity on the touch sensor panel (or proximity activity) while guarding the touch node electrodes and routing from stray capacitances that can form due to a touch or other stray capacitances. In some examples, the material(s) out of which guard planes 248 and 252 are made can be different. For example, guard plane 252 above the touch node electrodes can be made of ITO (or another fully or partially transparent conductor), and guard planes 248 in the substrate (e.g., PCB) can be made of a different conductor, such as copper, aluminum, or other conductor that may or may not be transparent.

Various capacitances associated with touch and/or proximity detection using configuration 230 are also shown in FIG. 2B. For simplicity of description, FIG. 2B assumes that earth ground and chassis ground are equivalent, but it is understood that additional capacitances may be represented when this assumption is invalid (e.g., chassis-to-earth capacitance, chassis-to-body capacitance, etc.). Specifically, an object 238 (e.g., a finger) can be in touching or in proximity to touch node electrode 236. Object 238 can be grounded to earth ground 234 through capacitance 240 (e.g., Cbody), which can represent a capacitance from object 238 through a user's body to earth ground/chassis ground 234. Capacitance 242 (e.g., Ctouch) can represent a capacitance between object 238 and touch node electrode 236, and can be the capacitance of interest in determining how close object 238 is to touch node electrode 236. Typically, Cbody 240 can be significantly larger than Ctouch 242 such that the equivalent series capacitance seen at touch node electrode 236 through object 238 can be approximately Ctouch 242. Capacitance 242 can be measured by touch sensing circuitry (e.g., sense amplifier 250) included in chiplet 207 (or touch chiplet 210) to determine an amount of touch at touch node electrode 236 based on the sensed touch signal. As shown in FIG. 2B, touch sensing circuitry in chiplet 207 can be referenced to guard ground (with some DC biasing provided by the chiplet 207 and/or PMU 214). In some examples, capacitance 244 (e.g., Cp) can be a parasitic capacitance between touch node electrode 236 and guard plane 248. Capacitance 246 (e.g., Cs) can be a stray capacitance between routing trace 258 coupled to touch node electrode 236 and guard plane 248, for example. In some examples, the impact of capacitances 244 and 246 on a sensed touch signal can be mitigated because guard plane 248 and touch sensing circuitry in chiplet 207 are all referenced to the virtual ground signal produced by guard source 254 during a guarded self-capacitance scan.

When guarded, the voltage at touch node electrode 236 and trace 258 can mirror or follow the voltage at guard plane 248, and thereby charge injected through capacitances 244 and 246 can be reduced or eliminated from the touch measurements performed by chiplet 207 (or touch chiplet 210). Without stray capacitances 244 and 246 affecting the touch measurements, the offset in the output signal of sense amplifier 250 (e.g., when no touch is detected at touch node electrode 236) can be greatly reduced or eliminated, which can increase the signal to noise ratio and/or the dynamic range of sense circuitry in chiplet 207. This, in turn, can improve the ability of touch sensing circuitry in chiplet 207 to detect a greater range of touch at touch node electrode 236, and to accurately detect smaller capacitances Ctouch 242 (and, thus, to accurately detect proximity activity at touch node electrode 236 at larger distances). Additionally, with a near-zero offset output signal from touch sensing circuitry in chiplet 207, the effects of drift due to environmental changes (e.g., temperature changes) can be greatly reduced. For example, if the signal out of sense amplifier 250 consumes 50% of its dynamic range due to undesirable/un-guarded stray capacitances in the system, and the analog front end (AFE) gain changes by 10% due to temperature, the sense amplifier 250 output may drift by 5% and the effective signal-to-noise ratio (SNR) can be limited to 26 dB. By reducing the undesirable/un-guarded stray capacitances by 20 dB, the effective SNR can be improved from 26 dB to 46 dB.

Figure 2C:
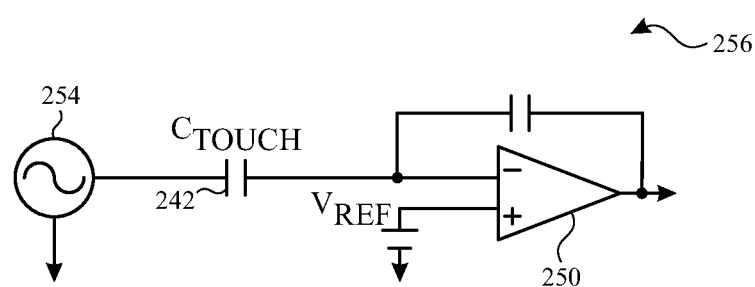
FIG. 2C illustrates an example equivalent circuit diagram of an example touch sensing configuration according to examples of the disclosure.

FIG. 2C illustrates an example equivalent circuit diagram of an example touch sensing configuration 256 according to examples of the disclosure. As described herein, guarding can reduce or eliminate capacitances 244 and 246 from the touch measurements performed by touch sensing circuitry in chiplet 207. As a result, the sense amplifier 250 can simply detect Ctouch 242, which can appear as a virtual mutual capacitance between object 238 and touch node electrode 236. Specifically, object 238 can appear to be stimulated (e.g., via Cbody 240) by guard source 254, and object 238 can have Ctouch 242 between it and the inverting input of sense amplifier 250. Changes in Ctouch 242 can, therefore, be sensed by sense amplifier 250 as changes in the virtual mutual capacitance Ctouch 242 between object 238 and sense amplifier 250. As such, the offset in the output signal of sense amplifier 250 (e.g., when no touch is detected at touch node electrode 236) can be greatly reduced or eliminated, as described above. As a result, sense amplifier 250 (e.g., the input stage of touch sensing circuitry of chiplet 207) need not support as great a dynamic input range that self-capacitance sense circuitry might otherwise need to support in circumstances/configurations that do not exhibit the virtual mutual capacitance effect described here.

Because the self-capacitance measurements of touch node electrodes in self-capacitance based touch screen configurations can exhibit the virtual mutual capacitance characteristics described above, chiplet 210 can be designed with a simpler sensing architecture to support both self-capacitance measurements and mutual capacitance measurements.

Referring back to FIG. 2A, integrated touch screen 204 can be integrated such that touch sensing circuit elements of the touch sensing system can be integrated with the display stack-up and some circuit elements can be shared between touch and display operations. It is noted that circuit elements are not limited to whole circuit components, such as a whole capacitor, a whole transistor, etc., but can include portions of circuitry, such as a conductive plate.

Figure 3A:
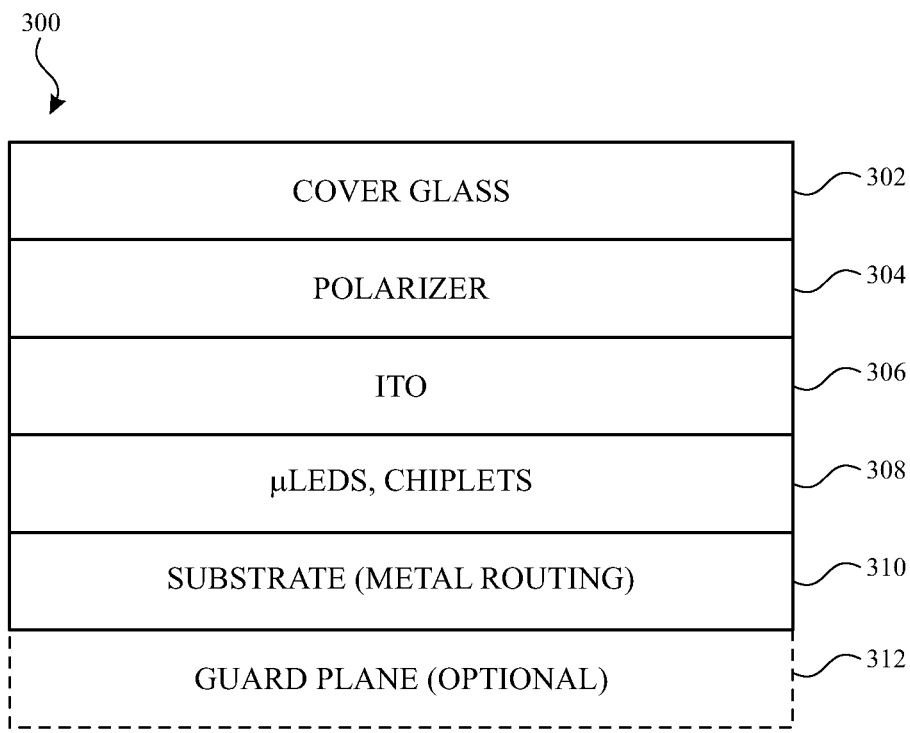
FIGS. 3A-3B illustrate example stack-ups of an integrated touch screen according to examples of the disclosure.
Figure 3B:
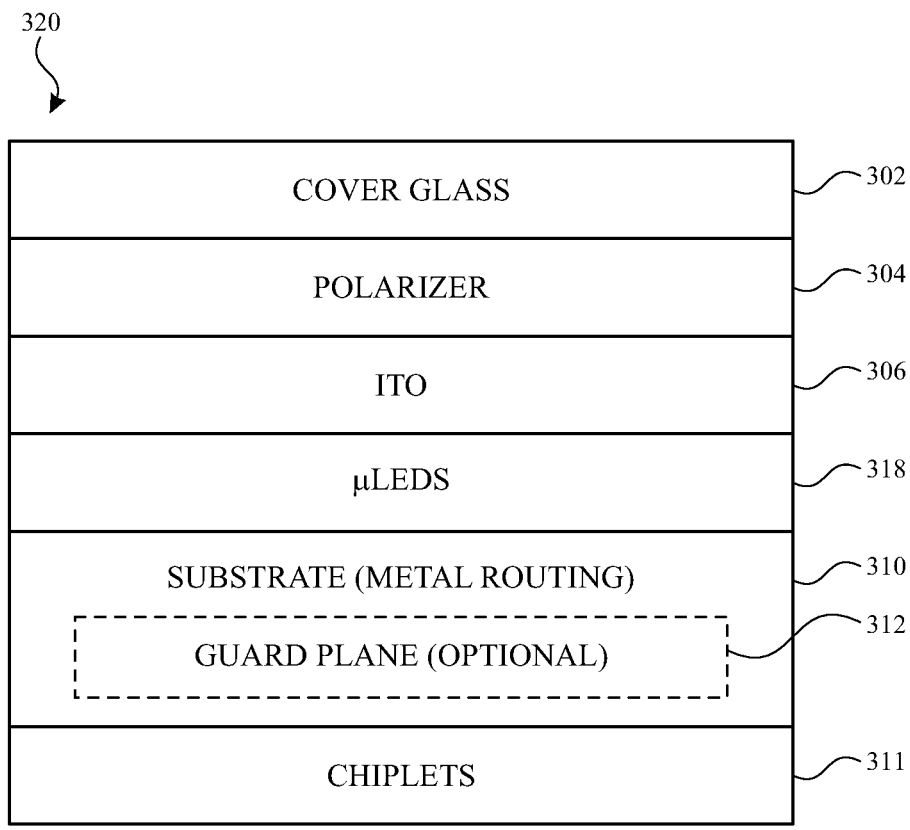

FIGS. 3A-3B illustrate example stack-ups of an integrated touch screen according to examples of the disclosure. FIG. 3A illustrates an example stack-up of a touch screen including chiplets (or touch chiplets and display chiplets) in the visible area of the display. Integrated touch screen 300 comprises a substrate 310 (e.g., a printed circuit board) upon which chiplets 207 (or touch chiplets 210 and/or display chiplets 208) and micro-LEDs 206 can be mounted in touch and display circuit layer 308. In some examples, the chiplets 207 and/or micro-LEDs 206 can be partially or fully embedded in the substrate (e.g., the components can be placed in depressions in the substrate). In some examples, the chiplets 207 can be mounted on one and/or both sides of substrate 310. For example, some or all of the chiplets 207 can be mounted on a second side of substrate 310 (or some or all of the touch chiplets 210 and/or some or all of the display chiplets 208 can be mounted on a second side of substrate 310). In some examples, the chiplets can be disposed on the second side of the substrate (opposite the first side of the substrate including micro-LEDs 206). FIG. 3B illustrates an example stack-up of a touch screen including chiplets (or touch chiplets and/or display chiplets) outside the visible area of the display (or within the visible area, but with chiplets at different layers). Unlike the stack-up of integrated touch screen 300, in which chiplets 207 and micro-LEDs 206 can be mounted in touch and display circuit layer 308, stack-up of integrated touch screen 320 can include chiplets mounted in a touch and display circuit layer 311 on a second (bottom) side of substrate 310 different than the micro-LEDs 206 mounted in a display pixel layer 318 on a first (top, visible) side of substrate 310. In some examples, placing the chiplets on the second side of the substrate can allow for uniform spacing of the micro-LEDs and/or increased density of micro-LEDs on the first side of substrate 310.

The substrate 310 can include routing traces in one or more layers to route signals between micro-LEDs 206, chiplets 207 and touch and display controller 212. Substrate 310 can also optionally include a guard plane 312 for guarded operation (e.g., corresponding to guard plane 248 in FIG. 2B). Although illustrated on the bottom of substrate 310 in FIG. 3A, guard plane 312 can be formed as a layer of substrate 310 other than the bottom layer (e.g., as illustrated in FIG. 3B in an internal layer of substrate 310).

After mounting micro-LEDs 206 and chiplets 207 in the touch and display circuit layer 308 in FIG. 3A (e.g., during a pick-and-place assembly), a planarization layer (e.g., transparent epoxy) can be deposited over the micro-LEDs 206 and chiplets 207. The planarization layer can be deposited over the micro-LEDs 206 in the display pixel layer 318 in the stack-up of FIG. 3B. A fully or partially transparent conductor layer 306 (e.g., ITO) can be deposited above planarized touch and display circuit layer 308 in FIG. 3A or above the display pixel layer 318 in FIG. 3B. Conductor layer 306 can include a pattern of individual conductor plates that can be used for touch and display functions of integrated touch screen 300. For example, individual conductor plates can be used as cathode terminals for micro-LEDs during display operations and groups of conductor plates can form touch node electrodes for touch operations. Polarizer 304 can be disposed above the transparent conductor layer 306 (optionally with another planarization layer disposed over the transparent conductor layer 306). In some examples, polarizer 304 can be omitted from the stackup. Cover glass (or front crystal) 302 can be disposed over polarizer 304 and form the outer surface of integrated touch screen 300. The stack-up of integrated touch screens 300 and/or 320 can provide numerous benefits including reduced costs (e.g., due to simplified assembly of devices including integrated touch and display module 202 and a reduced number of integrated circuits by combining touch and display functionality into integrated touch and display controller 212), reduced stack-up height (sharing conductors eliminates a separate touch node electrode layer; integrating chiplets 207 (or touch chiplets 210 and display chiplets 208) into the stack-up on the same layer with the micro-LEDs does not add to the stack-up height for FIG. 3A), simplified support for guarded self-capacitance scans (by including touch circuitry 213 on integrated touch and display module 202 with a guard plane extending throughout the substrate of integrated touch and display module 202), and shrinking the border region around the touch screen (because routing can be done through the substrate rather than in the border regions). Although not shown in FIGS. 3A-3B, it is understood that the NFC circuitry (e.g., NFC circuitry 201) can be integrated in the stackups of integrated touch screens 300 or 320, in some examples.

Figure 4B:
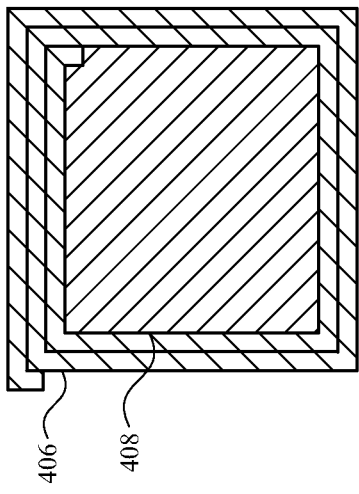
FIGS. 4A-4C illustrate circuitry configured to generate a magnetic field and a chiplet architecture for an example integrated touch screen according to examples of the disclosure.
Figure 4C:
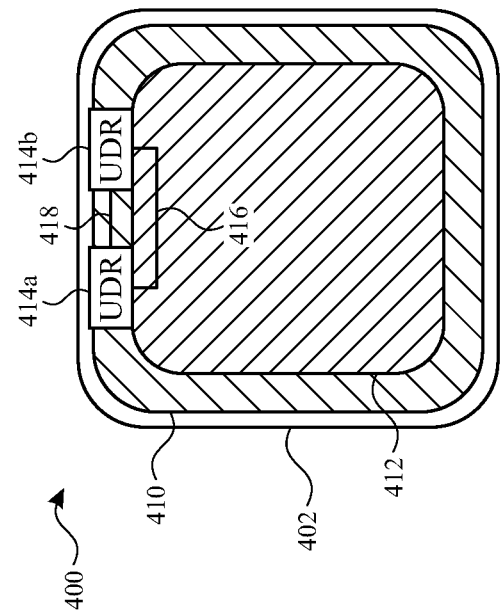
Figure 4A:
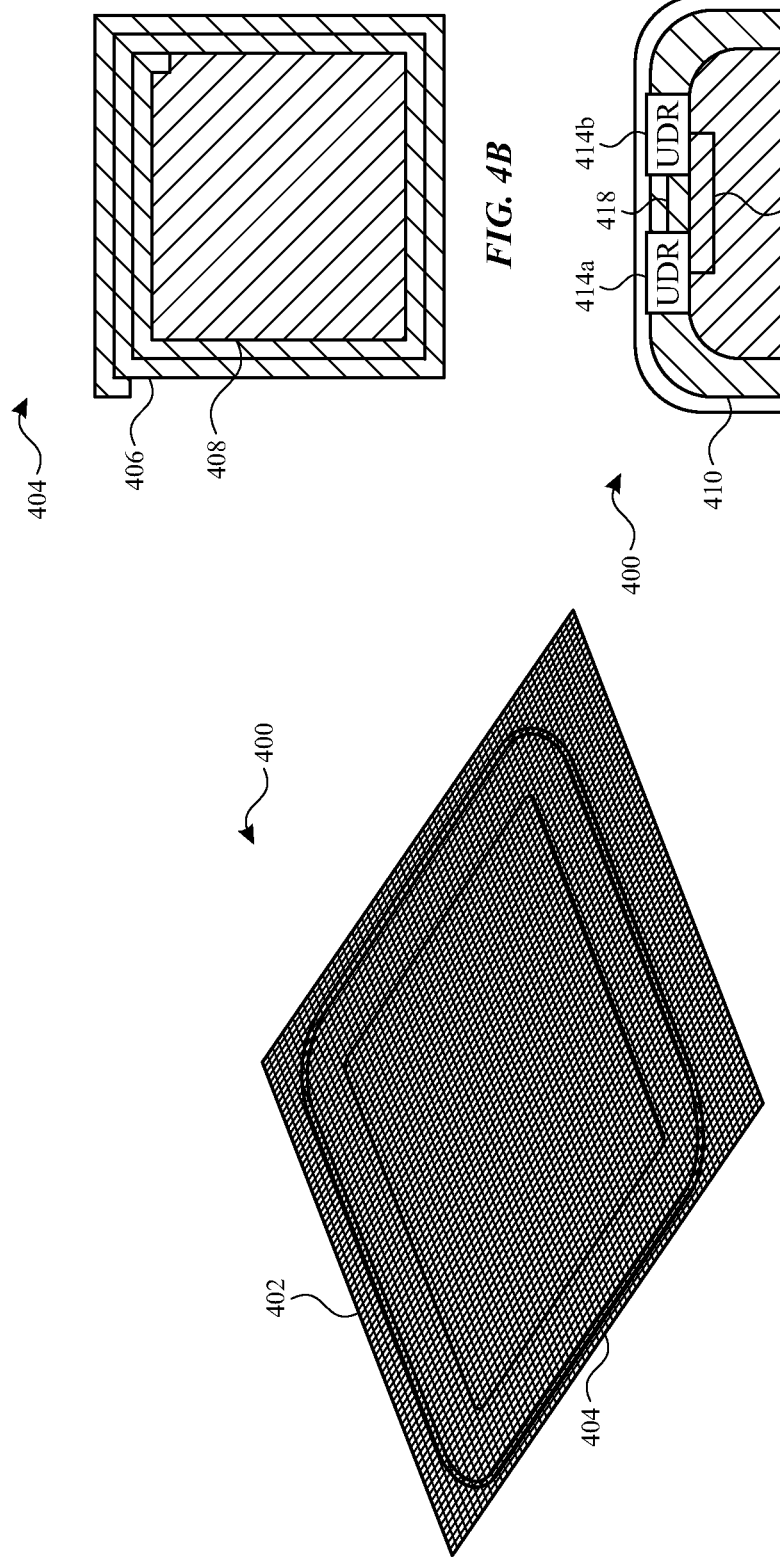

FIGS. 4A-4C illustrate an example near-field communication circuitry configured to generate a magnetic field and a representation of chiplet architecture for an example integrated touch screen according to examples of the disclosure. FIG. 4A illustrates a mesh backplane 402 overlaid over near-field communication circuitry according to examples of the disclosure. For example, in a stackup of an electronic device, the touch screen (as represented by backplane 402 in FIG. 4) can be disposed between the coil of the NFC circuitry and a cover substrate (e.g., cover glass). Device 400 can include a backplane 402 that can be representative of the touch screen or a portion of the touch screen. For example, the backplane can represent a substrate (e.g., corresponding to substrate 310) used for mounting the chiplets and/or LEDs/OLEDs, and/or can represent the area in which arrays of chiplets and/or the LEDs/OLEDs are disposed. In some examples, the mesh of backplane 402 can represent the routing traces providing connections for the touch and display circuitry (e.g., routing traces for signals and power to the chiplets). In some examples, the routing can be implemented within or on the surface of the substrate. In some examples, the mesh of the backplane can be representative of conductive materials (e.g., copper, indium-tin oxide, or other metals) or a plurality of conductive material layers used to implement the routing traces. The device 400 can also include near field communication circuitry including coil 404 that is configured to emit and receive electromagnetic waves for near field communications (e.g., inductive coupling). Coil 404 can be fabricated from any suitable material, including, but not limited to, copper, aluminum, conductive ink, etc. In some examples, the coil can be optimized to operate in a specific frequency range (e.g., for near field communication, radio frequency identification, or other wireless standards).

FIG. 4B illustrates an example coil used to emit and receive electromagnetic waves according to examples of the disclosure. Coil 404 can be included as part NFC circuitry (e.g., corresponding to NFC circuitry 201) and configured as an NFC antenna. In some examples, coil 404 can include one or more traces 406 in a concentric arrangement and a core 408. Although trace 406 is illustrated as a continuous metal trace wrapped around the core material, the dimensions, layout, and structural aspects of the coil can differ from the shown layout. For example, trace width, thickness, and routing can be varied. In some examples, the coil 404 can be a non-planar coil. In some examples, one or more traces forming coil 404 can be connected to one or more interconnects (e.g., vias) to route the trace between multiple layers of a circuit board. The continuous trace can additionally or alternatively be separated into a plurality of separate, but electrically connected traces. In some examples, the circuitry can be laid out on or within the design of printed circuit board so that the coil and/or NFC circuitry can be integrated in or in proximity to a touch screen stackup. Core 408 can comprise materials selected to maximize, for example, permeability of magnetic fields. For example, the core 408 can be formed from ferromagnetic materials including, but not limited to, iron, steel, or other ferromagnetic compounds that have higher permeability relative to the air and/or environment around the coil 404. The core 408 as illustrated appears as a continuous piece of material. However, in some examples, the core can be formed from a plurality of materials, that are optionally coupled together. For example, a plurality of cores can be laminated together to improve coil efficiency. In some examples, coil 404 can be backed by a ferrite material rather than simply implementing a ferrite core (e.g., coil 404 can be formed on a ferrite material such that the area in the center of the coil, the area below the coil and/or the area outside the coil are formed of ferrite material). The magnetic fields generated by coil 404 can be normal to and/or otherwise extend at least partially through backplane 402 and/or the cover material. As a result, the magnetic fields generated by coil 404 can interfere with the touch sensing circuitry (e.g., chiplets and/or routing) and touch sensing operations.

FIG. 4C illustrates an example simplified map of an electromagnetic field generated by the coil 404 for electronic device 400 and a superimposed representation of some chiplets of the touch screen according to examples of the disclosure. As described herein, electromagnetic fields of varying strength generated by NFC circuitry within device 400 (e.g., generated during operation by driving current on coil 404) can interfere with signals of the touch sensing system (e.g., as the signals propagate across the backplane). Additionally or alternatively, electromagnetic fields external to, but acting on, the device (e.g., another device with NFC circuitry and/or environments with time-varying magnetic fields, such as while the device is in proximity to wireless charging circuitry) can be considered as affecting the signals of the touch sensing system (e.g., as the signals propagate across the backplane). As described herein, the level of interference due to electromagnetic fields emitted by the NFC circuitry will be described, however it is understood that the net effect of a plurality of electromagnetic fields that can constructively and/or destructively interfere with each other can be considered.

As shown in FIG. 4C, the magnetic field within region 410 can represent a region of relatively high magnetic field and induced electric field (e.g., above a threshold) that can interfere relatively more with signals of the touch sensing system, and region 412 can represent a region of relatively low magnetic field and low induced electric field (e.g., below a threshold) that can interfere less with signals of the touch sensing system. The magnetic fields indicated in regions 410 and 412 can be due to operation of coil 404 and can be normal to the plane of device 400 or otherwise oriented such the routing and/or chiplets of the touch sensing system are influenced by the magnetic fields (to differing degrees). Inside the metal backplane, electric fields in regions 410 and 412 can be induced as a result of the oscillating magnetic fields. These electric fields can be tangential to the backplane (non-perpendicular). For example, FIG. 4C illustrates two representative micro-driver chiplets 414a and 414b, which can be disposed above the NFC circuitry (e.g., above coil 404), but it is understood that an array of chiplets can be disposed across the touch screen of device 400.

In some examples, each chiplet in the array can be coupled to analog or digital lines including power supply lines, data lines, control lines, clock lines, etc. Each of these routing traces providing the analog or digital lines to the chiplets from other circuitry (e.g., from touch and display IC 212, PMU 214, etc.) may be subject to parasitic effects of the trace length (e.g., due to resistive and capacitive modeling of the traces) and also may be subject to interference due to electromagnetic fields (e.g., the magnetic/electric fields generated/induced by the NFC circuitry). In some examples, to reduce the interference with the NFC circuitry and with electromagnetic field more generally, the length of the traces and layout of the traces can be modified, as described in more detail herein. Additionally or alternatively, the number of routing traces can be reduced as well by routing some signals through chiplets, as described in more detail herein.

As an example, the routing paths can be optimized to reduce interference with the magnetic fields. Rather than routing a signal line (e.g., a data line, clock line, power line, etc.) to a first micro-driver chiplet 414a using a first routing path (not shown) from the signal source (e.g., from a top edge), and routing the signal line to a second micro-driver chiplet 414b using a second routing path (not shown) from the signal source (e.g., from the top edge), the signal line can be routed to the first microdriver chiplet 414a using the first routing path (not shown) and then using a second routing path (e.g., either routing path 416 or 418) from the first microdriver chiplet 414a to the second microdriver chiplet 414b can be made (not routing the signal to each of the two illustrated chiplets separately from the signal source). This technique can reduce the amount of routing as well as reduce the routing trace lengths, as described herein. Additionally, the routing paths between a pair of microdrivers (e.g., between microdriver chiplet 414a and microdriver chiplet 414b) can be optimized to reduce interference. For example, FIG. 4C illustrates two different routing path options between the first microdriver chiplet 414a and the second micro-driver chiplet 414b. For example, path 418 can be representative of a first conductive path option between micro-driver chiplets 414a and 414b, and path 416 can be representative of a second conductive path option between micro-driver chiplets 414a and 414b. Although path 418 is shorter than path 416, path 418 is routed through region 410 of relatively strong induced electric field directed parallel to the routing traces, whereas path 416 is longer than path 418, but is primarily routed through region 412 of relatively weak strength and/or perpendicular induced electric field. As a result, in the presence of the stronger electromagnetic field in region 410, noise (e.g., a voltage drop or rise often referred to as a noise voltage) can be induced along the path 418, causing unwanted degradation of signal levels (e.g., with respect to the backplane) that are routed along path 418. In contrast, in the presence of the weaker electric field in region 412, the noise induced on path 416 is relatively less. In some examples, the routing can be optimized to minimize noise on signals passing between micro-driver chiplets 414a and 414b.

It is understood that electromagnetic fields can be vector quantities such that induced noise depends upon the angle of the orientation of routing traces and the surrounding electric and magnetic fields. To simplify description, the disclosure often omits description of the angular relationship between routing traces and the oscillating magnetic fields (e.g., the analysis considers the induction effects of oscillating Bz field alone because the circuit is almost two-dimensional (e.g., approximately two-dimensional, the inter layer z-heights smaller than the lateral dimensions of the circuit) and the field only pierces open loops in the x-y plane whose normal vectors are along the z-axis). Similarly, although the spatial gradients of electromagnetic fields (e.g., spatially varying magnetic flux) also impacts, the discussion herein is often simplified and instead refers to regions of strong induced electric fields in the backplane that run parallel to a charge carrying routing traces/conductor and/or strong magnetic fields that run perpendicular to loops in the routing traces.

As described herein, in some examples, the backplane can be configured to further minimize interference by using one or more chiplets. As described above, the signals can be subject to a noise voltage induced by the presence of electromagnetic fields. As described herein, the backplane and associated components—also referred to as a distributed circuit—can be configured to mitigate effects of unwanted electromagnetic interference (i.e., noise). In some examples, the backplane impedance (i.e., resistance) can be analyzed to anticipate noise distribution around the backplane from electromagnetic fields. In some examples, the backplane can be configured as an interdigitated mesh of components and connecting traces. Additionally or alternatively, the backplane can be configured as a continuous sheet of one or more materials (e.g., a transparent conductive material, metal materials, etc.). As described herein, the backplane may often be described as a mesh of traces and associated components, however the described embodiments are merely exemplary, and not limiting in any way. Furthermore, various aspects of the backplane are described as if the backplane lies flat in a 2-dimensional plane (e.g., a planar backplane), however, the descriptions are merely exemplary, and it is understood that the orientation of the backplane and constituent traces and components are not limited in any way. In some examples, the backplane comprises traces extending in a first direction (e.g., arranged as columns) and further comprises traces extending in a second direction (e.g., arranged as rows). Accordingly, each trace can have an associated impedance, which can further be used to understand how an applied electromagnetic field would induce voltages (i.e., noise) between traces at various locations of the backplane. In addition, although the ensuing disclosure relates to chiplets and mesh backplanes, it is understood that these descriptions are merely exemplary. The foregoing embodiments can also be applied to any distributed circuits and use various components (e.g., amplifiers configured as buffers) to achieve similar outcomes.

Figure 5:
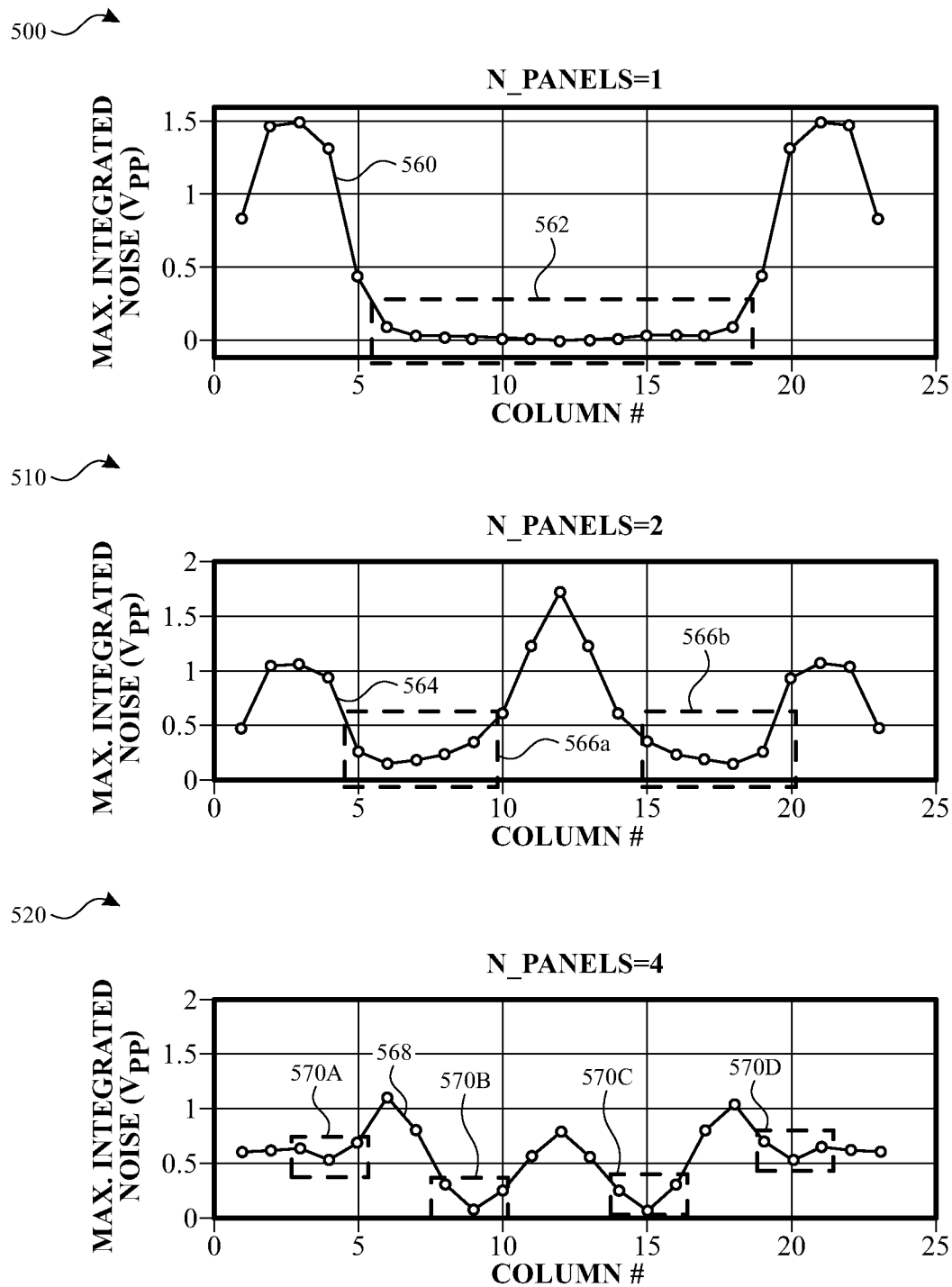
FIG. 5 illustrates plots representing noise induced between a backbone signal trace and a backplane according to examples of the disclosure.

FIG. 5 illustrates plots 500, 510 and 520 representing noise voltages induced between a backplane and a vertical trace that runs down the length of the panel as a function of the column location according to examples of the disclosure. In some examples, an electronic device can include one backplane comprising one panel. In some examples, an electronic device can have a backplane divided into a plurality of electrically separated backplane panels, referred to herein as backplane panels. Increasing the number of backplane panels can reduce the impact of interference of the touch and display system's conductive backplane with the transmission of the NFC circuitry through the display. For example, eddy currents in the touch system backplane panels can be reduced when they are electrically separated (e.g., isolated), which can preserve the magnetic field that propagates through the backplane, and is detected by or generated by the NFC circuitry.

As described herein, the noise induced between a vertically routed trace and at the backplane (e.g., corresponding to backplane 402) can vary based on the number of backplane panels. In some examples, the placement of the routing of signals for the chiplet architecture can be determined based on the noise distribution. For example, the signals can be routed in the vertical direction using a backbone column at regions corresponding to columns with minimal noise. As used herein, a backbone column can refer to a panel partition that contains one or more signals routed in a vertical direction, from which horizontal branches can extend.

For example, plots 500, 510 and 520 illustrate noise voltages between a backplane and vertical traces induced by an internal coil across the length of a plurality of backplane columns. It is understood that similar plots can also be generated using measurements or electromagnetic simulations of noise induced by external coils, which may have similar characteristics. Plot 500 illustrates noise voltage curve 560, which corresponds to a backplane comprising a single backplane panel. Noise voltage curve 560 has local maxima approximately between columns 2-4 and between columns 20-22. Accordingly, to avoid induced noise voltages, backplane columns, such as columns included in region 562, which correspond to absolute or local minima in the noise curve, can be selected for position the backbone column for routing signals in a vertical direction of the backplane. Plot 510 illustrates a noise voltage curve corresponding to a backplane with two backplane panels. Noise voltage curve 564 can include local maxima approximately between columns 2-4 and between columns 20-22, like noise voltage curve 560, but also include an absolute maximum at approximately column 12. In some examples, the routing traces can be implemented in one or more backplane columns at regions 566a and 566b, where noise voltage has local or absolute minima. In a similar manner, plot 520 illustrates a noise voltage curve corresponding to a backplane with four backplane panels. Noise voltage curve 568 can include local maxima or absolute maxima at approximately columns 6, 12, and 18, and can include local or absolute minima at approximately columns 4, 9, 15 and 20. In some examples, the routing traces can be implemented in one or more backplane columns at regions 570a-d where induced noise voltage is minimized. In some examples, two backbone columns can be used at regions 570b and 570c. In some examples, four backbone columns can be used at regions 570a-570d. In some examples, the number of backplanes can be greater than shown (e.g., 8, 10, 12, 16, etc.).

Figure 6:
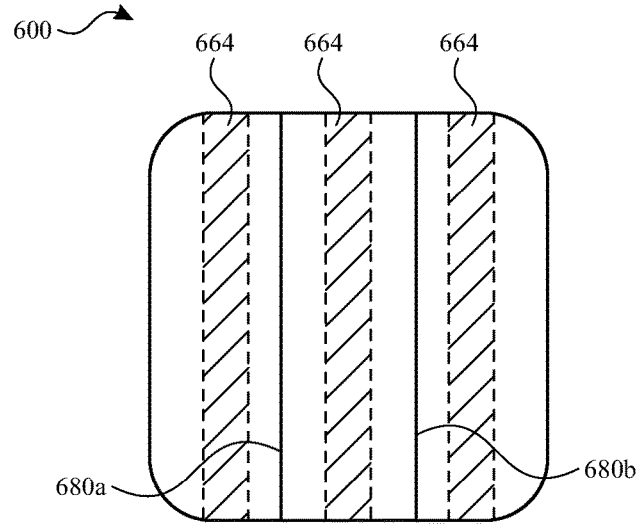
FIG. 6 illustrates a representation of a backplane and induced electromagnetic field according to examples of the disclosure.

As described herein, backbone columns can be used to route signals for the plurality of chiplets from an edge (e.g., a top edge) of the touch sensor panel. In particular, backbone columns can be used to route signals traveling relatively longer distances at local minima of the noise as described herein, whereas signals traveling relatively short distances can be routed in some or all of the columns (e.g., even without local minima of the noise). The placement of the backbone columns can be at regions with absolute or local minima of noise interference from the near-field communication circuitry. FIG. 6 illustrates a simplified representation of a backplane and induced electromagnetic field according to examples of the disclosure. For example, backplane 600 can correspond to a backplane implemented with two backplane panels. The three regions with relatively large induced electric field in plot 510 are represented in FIG. 6 by regions 664 (e.g., directly above the NFC coil traces and in the central region corresponding to the inner edges of the backplane panels). As a result, backplane 600 can include routing signals in backbone column 680a and/or in backbone column 680b. Each backbone column can be located, for example, at columns of the backplane within regions of absolute or local noise minima (e.g., columns corresponding to regions 566a and 566b). The backbone column can represent a panel partition that can route one or more signal lines down from the edge of the panel. In some examples, the one or more signal lines can be subsequently routed horizontally from either side of the backbone column. It should be understood that although backbone columns are described herein, other orientations are possible. For example, a backbone row can be used to route signals for a touch sensor panel/display (e.g., a touch screen) from the side (e.g., left or right edge), depending on the noise voltage curves.

Figure 7:
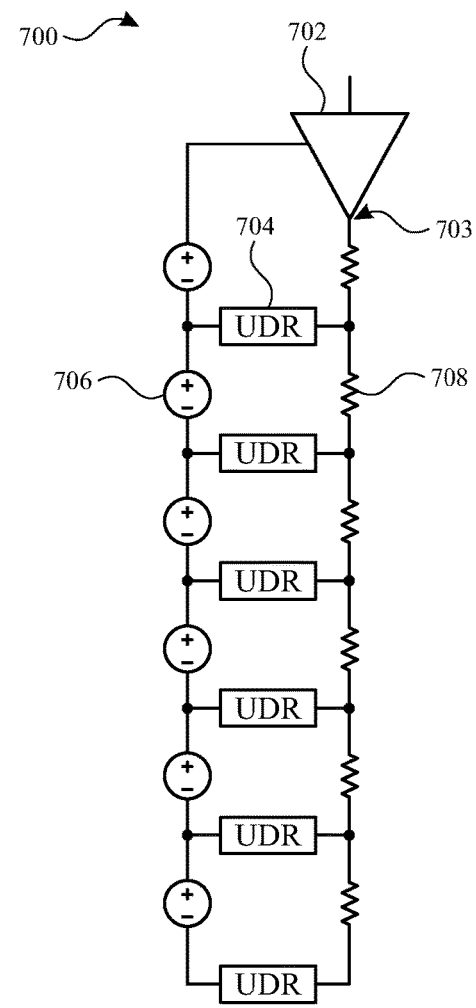
FIG. 7 illustrates an equivalent circuit schematic representing accumulated noise between a backbone signal trace and of a portion of a backplane according to examples of the disclosure.

As described herein, in some examples, chiplets can be used as repeaters to reduce the amount of routing traces and the total trace length (and reduce the possibility of traces forming loop structures that are more susceptible to inductive interference with the NFC coil). FIG. 7 illustrates an equivalent circuit schematic representing accumulated noise between a backbone signal trace and a backplane according to examples of the disclosure. The illustrated circuit can represent an example backbone column, as described in reference to FIGS. 5 and 6, for one representative digital signal line (e.g., a data line) coupled to a plurality of micro-driver chiplets 704. For example, circuitry 700 includes amplifier 702 (e.g., in PMU 214 or touch and/or display IC 212), which can be configured to output a signal from output node 703 that propagates down the column. The signal line can be coupled to each of the plurality of micro-driver chiplets 704. Resistors 708 can represent lumped impedances distributed along the length of the backbone column. Sources 706 can represent voltage sources indicative of DC or AC parasitic voltage drops that accrue as a signal propagates down the backbone column (e.g., due to parasitics of the routing traces and, in particular, due to induced voltage noise from the magnetic fields). In some examples, the voltage drop may be 1-200 mV (e.g., as high as 200V/m) along each segment of the routing trace before reaching the next micro-driver chiplet in the column of micro-driver chiplets. As shown in FIG. 7, the longer trace lengths result in accumulation of impedances and/or voltage drops, which can result in micro-drivers chiplets further from amplifier 702 receiving a reduced or noisier signal. For example, the noise level on a signal received by a micro-driver chiplet at the bottom of the column of micro-driver chiplets can be higher than the noise level on a signal received by a micro-driver chiplet at the top of the column of micro-driver chiplets (e.g., closest to amplifier 702).

In some examples, one or more of the chiplets can be used as repeaters to shorten trace lengths and improve noise levels by regenerating power/signal line levels (e.g., receive a signal at its input and mirror the signal at its output). For example, FIG. 8 illustrates using each micro-driver chiplet in a column to regenerate (replicate) a respective signal line and FIG. 9 illustrates using alternating micro-driver chiplet in a column to regenerate a respective signal line (e.g., even chiplets in the column regenerating a first respective signal and odd chiplets in the column regenerating a second respective signal). Accordingly, the micro-driver chiplets can propagate signals down a backbone column and minimize accumulated noise by replicating the signal received at the chiplet input, ensuring noise voltages or other parasitic effects do not accumulate and distort signals carried across the backplane.

In some examples, the backbone column can be configured to propagate digital signals. For example, the micro-driver chiplets can receive a signal that propagates from amplifier 702 (e.g., representative of a digital logic driver circuit). The micro-driver chiplet can include circuitry configured to preserve fidelity of the digital signal (e.g., designed with noise immune and/or resistant circuitry). In some examples, the described signal can be replicated using a buffer circuit within the micro-driver chiplet. The replication of a signal can be repeated one or more times (in one or more chiplets) along the length of the backbone column, for example. In some examples, the backbone column can be configured to replicate and propagate analog signals (e.g., re-referencing the analog signals within the chiplet) to achieve a similar benefit for analog signals. For example, an analog signal can pass through a filter and/or be sampled to mitigate the accumulation of noise. However, in some examples, due to the hardware penalties (e.g., size) of the analog buffers, the replication described herein can be limited to digital signals when chiplet size may be limited. Although FIG. 7 illustrates one signal line and one power supply line, that the use of chiplets as repeaters can be applied to buffer any and/or all signals within an exemplary touch and display device which may reside within a backbone column or elsewhere on the panel (e.g., in other columns without minima in the noise).

In some examples, in order to optimize the design, the replication of the signal within micro-drivers can be minimized for a backbone column while maintaining integrity of the digital signals (e.g., maximize spacing between the micro-driver chiplets used for replicating the signal). For example, an electromagnetic field source and induced noise voltage (e.g., 50-200 millivolts) can be measured or simulated along a segment of a backbone column (e.g., 1-5000 micron). A micro-driver chiplet with a specified input noise margin (e.g., several hundred millivolts) can then be connected to sample the signal propagating through the backbone column (between portions of the trace that would otherwise accumulate a large noise voltage) and remove the noise voltage caused by the external field source. Knowledge of the expected induced electric fields in volts per meter allows the calculation of voltage noise that can accumulate over a specified length (e.g., several millimeters), and can inform designers to the required spacing between micro-drivers that perform replication of signals. Accordingly, the described backplane configuration can be applied to effectively eliminate the cumulative noise voltage induced by magnetic fields to preserve signal integrity.

FIG. 8 illustrates an example configuration 800 of a plurality of chiplets configured to minimize noise according to examples of the disclosure. In some examples, signals can be re-referenced along a backbone column using a plurality of buffers of a plurality of micro-driver chiplets connected serially. For example, a signal 802 can correspond to a digital signal routed to and between a plurality of micro-driver chiplets. An individual micro-driver chiplet 810 can include multiple buffer circuits including buffer 812, bi-directional buffer 814 and readback buffer 816. As illustrated in FIG. 8, the micro-driver chiplet 810 can include a first pin 811 and a second pin 813, though in some examples, some or all of the buffers can be coupled to a shared pin. Buffer 812 can be implemented as a Schmitt trigger with hysteresis to increase noise margin of the input of the chiplet at pin 811 and to provide noise immunity to the micro-driver chiplet (e.g., by forcing the buffer output signal of buffer 812 to predefined levels when receiving signal 802). The output of signal of buffer 812 can be used internally by the chiplet during touch and/or display operations. A readback buffer 816 can also be connected to pin 811. Readback buffer 816 can drive a signal (e.g., a capacitive touch value) from chiplet to touch and display controller (or host processor) when in a read-back mode. The micro-driver can also include one or more bi-directional buffers 814 for use in regenerating signals as described herein. A bi-directional buffer 814 can be configured, for example, as a noise resistant pathway to buffer signal 802 received at pin 813 and output the buffered signal to pin 815. The output of the buffered signal can be coupled to input pins of a downstream micro-driver chiplet.

Although not shown in FIG. 8, in some examples, the chiplets can include switching circuitry between the input pins and the buffers of the chiplets. The switching circuitry can couple the appropriate buffer(s) to the appropriate pin(s) according to the operation of the chiplet. For example, buffer 812 can be coupled to pin 811 during touch sensing operations and decoupled from pin 811 during readback operations, whereas readback buffer 816 can be coupled to pin 811 during readback operations and decoupled from pin 811 during touch sensing operations.

In some examples, the bi-directional buffer 814 of a chiplet can be implemented using a pair of buffers 814*a* and 814*b* in parallel between pin 813 and pin 815. In some examples, each of the buffers 814*a* and 814*b* can be connected in series to a respective switch (e.g., at the output of the respective buffer). In some examples, buffers 814*a* and 814*b* can be implemented as hysteretic Schmitt triggers. The switches can be controlled to allow signal flow to toggle between the two directions. The switches and buffers can be driven by control logic implemented within a touch and display device, for example. In some examples, micro-driver chiplet 810 can comprise multiple sets of buffers (e.g., corresponding to buffer 812, readback buffer 816, and/or bi-directional buffers 814). In some examples, signal paths can be selected based on the type of digital signal. Backplane columns (or rows), for example, can carry signals that are widely used digital signals (e.g., global control signals), and/or data signals. In some examples, the backplane rows (or columns) can carry clock signals, tokens, etc. In some examples, the backplane can include a component configured to connect signals within the panel to carry the signals from the edge of the panel to one or more designated columns (e.g., a shorting bar). For example, a horizontal shorting bar comprising a mesh with local increased conductivity, may be placed in a region of the touch sensor panel/display where the noise is relatively low (e.g., outside the area of the NFC coil, or with reduced overlap with the coil), typically near the touch sensor panel/display edge (e.g., corresponding to one or more rows of the touch screen along a top edge). The shorting bar can be used to route power nets for sub-panels of the backplane. The shorting bar can provide lower resistance connections between the sub-panels of the backplane and the panel edge pins, and can be used to reduce the number of buffers and/or routing traces used for horizontal routing of signals with regions with relatively more noise.

As illustrated in FIG. 8, each micro-driver chiplet in a column regenerates a respective signal line. In some examples, as described herein the signal may be able to meet design requirements without replicating the signal in each chiplet in the column. In some examples, the bi-directional buffers 814 of a chiplet that is not used for regenerating a first signal can be used for regenerating a second signal, which can reduce the number of bidirectional buffers required in the design of the chiplet (e.g., potentially reducing the cost and/or size of the chiplet). For example, regenerating a signal in an alternating pattern (e.g., every other chiplet in the column) can allow for two signals to be regenerated along the column using the same buffer circuitry as used for one signal when regenerating in each chiplet in the column.

FIG. 9 illustrates an example configuration of a plurality of chiplets configured to reduce noise between signal lines and a backplane according to examples of the disclosure. In some examples, a backplane column can be configured to regenerate multiple signals using respective micro-driver chiplets. For example, with respect to circuitry 900, signal $V_A$ (or a regenerated version of $V_A$) can be connected to buffers 912A and/or readback buffers 916A (e.g., corresponding to buffers 812 and readback buffers 816), and signal $V_B$ (or a regenerated version of $V_B$) can be connected to buffers 912B and/or readback buffers 916B (e.g., corresponding to buffers 812 and readback buffers 816) of each chiplet for use in touch and/or display operation. However, signals $V_A$ and $V_B$ are regenerated in alternating chiplets. For example, signal $V_A$ is connected to micro-driver chiplets 910b and 910d and regenerated using their bi-directional buffers 914. In a similar manner, signal $V_B$ is connected to micro-driver chiplets 910a and 910c and regenerated using their respective bi-directional buffers 914.

As described herein, the configuration of FIG. 9 can provide design flexibility. For example, designs that do not require signal re-referencing at every micro-driver chiplet can use less bi-directional buffer circuitry or re-reference more signals without increasing the bi-direction buffer circuitry per chiplet. For example, if chiplets have a noise tolerance for signals $V_A$ and $V_B$ that exceeds an anticipated induced noise voltage per unit distance that accrues as signals $V_A$ and $V_B$ travels the distance to the chiplet, re-referencing the signal may not be required for each chiplet. In some such examples, the backplane column can be configured to re-reference signals $V_A$ and $V_B$ at alternating micro-drivers such that sufficient noise margin is preserved and routing resources are maximized.

The configuration concept illustrated in FIG. 9 can be extended in some examples to other configurations than illustrated. For example, the number of signal lines that are re-referenced may be increased and/or decreased and/or the re-referencing pattern between micro-driver chiplets may be changed or different for different signal lines (e.g., re-referencing each chiplet or every third or fourth or other number of chiplets). In some examples, additional bidirectional buffers can be added to the chiplets to accommodate an increase in the number of signal lines to route. In some examples, reducing the frequency of re-referencing for one or more of the signals can accommodate an increase in the number of signal lines to route without adding bi-directional buffers. Furthermore, it is understood that although FIGS. 7-9 illustrate one backplane column, that the configuration of FIGS. 8-9 can be similarly used for a plurality of backplane columns. In addition, although the embodiments described have been discussed with respect to a column of components, the configurations can also be applied to rows or other routing configurations with or without the use of a backbone structure (e.g., diagonally or piece-wise across a backplane).

Figure 10:
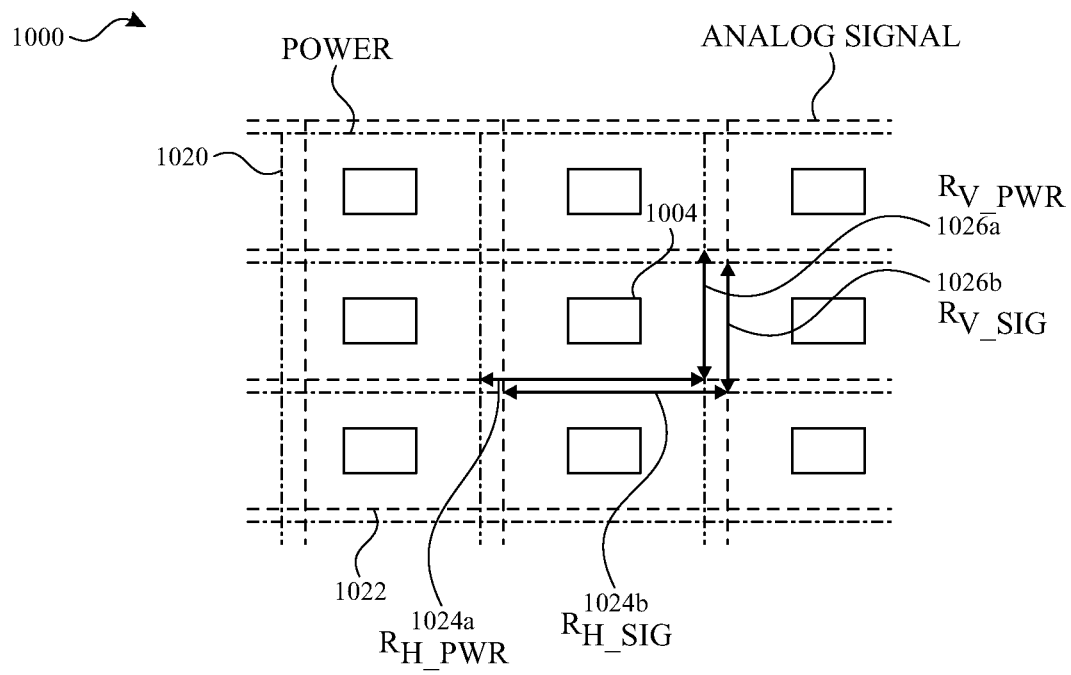
FIG. 10 illustrates an example configuration of a backplane configured to reduce noise according to examples of the disclosure.

As described herein, a backplane can be configured to minimize noise for non-quantized signals. In some examples, a backplane can be configured to balance the directional impedance of signal traces to reduce noise (e.g., differential mode noise). FIG. 10 illustrates an example configuration of a backplane configured to reduce noise according to examples of the disclosure. Backplane 1000 can include one or more micro-drivers surrounded by a plurality of signal carrying traces. As described previously, in the presence of an electromagnetic field, signals carried by the backplane can be subject to noise. In some examples, noise immunity for analog signals can be designed into the backplane configuration by balancing the impedance of traces extending in different directions. For example, a plurality of traces can extend vertically and horizontally, surrounding the micro-drivers as shown in FIG. 10. For example, representative power trace 1020 can correspond to trace routes configured to carry analog power signals (e.g., one or more positive and/or negative supply rails). Similarly, representative signal traces 1022 can correspond to trace routes configured to carry analog data signals (e.g., analog reference signals and/or data). By ensuring the ratio of trace resistances between the horizontal and vertical routes of a first respective signal are equal, or almost equal (e.g., within a threshold tolerance), to the ratios of trace resistances between the horizontal and vertical routes of a second respective signal, the backplane can minimize induced voltage noise between respective signals within the backplane (e.g., from the power traces to the signal traces). In some examples, balancing the ratio of trace resistances can include adding additional signal traces for an analog signal line and/or an analog power line to match the number of traces used for a given net. For example, FIG. 10 shows a portion of a display panel with four horizontal traces and three vertical traces for each of the power and signal nets. It is understood that matching the ratio of trace resistances may include adding traces beyond the minimal trace length or width that would be required. For example, a fishbone configuration for the analog signal mesh may require only one of the three vertical traces, but the additional vertical traces can be implemented to match the ratio of trace resistances and minimize noise coupling. As described herein, the ratio of trace resistance can refer to a sheet impedance or an impedance per unit area (or per unit distance).

Figure 11:
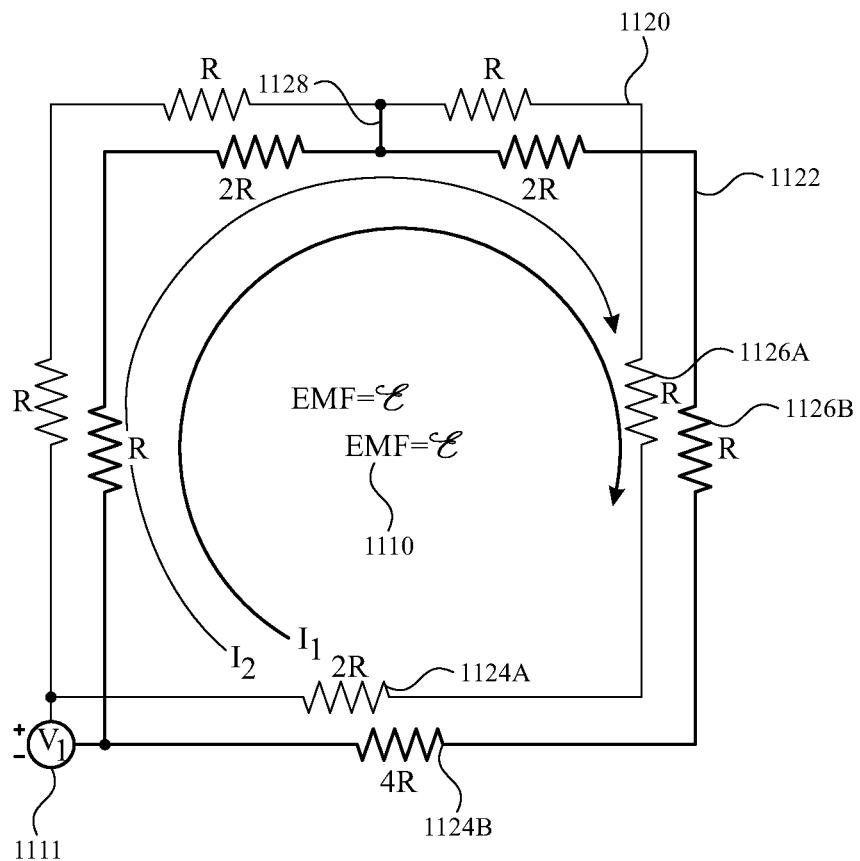
FIG. 11 illustrates an example circuit schematic representative of a portion of a backplane according to examples of the disclosure.

FIG. 11 illustrates an example circuit schematic representative of a portion of backplane according to examples of the disclosure. In some examples, adjacent networks of traces of a backplane, referred to herein as meshes, can be configured to control noise induced by an electromagnetic field by varying resistances. Mesh 1120 and mesh 1122 can be representative of two adjacent mesh networks that are subject to induced noise, represented by electro-motive force (EMF) 1110. In this example, it is assumed that the traces of mesh 1120 and 1122 overlap, or are placed sufficiently close together that there is negligible magnetic flux captured in the open area between them. Each respective mesh can have resistances (e.g., corresponding to a horizontal or vertical mesh resistance). For example, mesh 1120 comprises resistance 1126A (e.g., corresponding to a vertical trace resistance) and resistance 1124A (e.g., corresponding to a horizontal trace resistance). Similarly, mesh 1122 comprises resistance 1126B (e.g., corresponding to a vertical trace resistance) and resistance 1124B (e.g., corresponding to a horizontal trace resistance). The adjacent meshes can be connected, for example, via a component of the backplane, at the panel edge (e.g., top edge) or at the touch and display integrated circuit (e.g., touch and display controller 212), represented by connection 1128 (e.g., a connection to a shared chiplet). In some examples, the resistances of the respective meshes can differ in value, inducing differential mode noise between the meshes. For example, a ratio between the resistances of a mesh can be calculated to predict noise that exists between two or more meshes. Mesh 1120, comprising resistance 1124A and resistance 1126A in the illustrated example, can have a resistance ratio (e.g., corresponding to a horizontal resistance divided by a vertical resistance) of 2:1, whereas mesh 1122, comprising resistance 1124B and 1126B in the illustrated example, can have a resistance ratio of 4:1. As a result, the interaction of an electromagnetic field will cause the electro-motive force (EMF 1110) induced within each mesh to distribute itself differently in each mesh according to Ohm's Law. Accordingly, a local noise voltage can be observed when measuring points of the respective meshes that are in close physical proximity. For example, source 1111 can represent noise (e.g., differential mode voltage) that is induced at a particular location between the meshes due to the differing resistance ratios. A chiplet at this location would see noise voltage represented by source 1111 between signals delivered on mesh 1120 and 1122. In some examples, the resistance ratios of the respective meshes can be configured to reduce noise (e.g., differential mode noise) that is induced in proximity to the adjacent meshes. In some examples, the noise can be minimized when the resistance ratio of the respective meshes are configured to be the equal or within a threshold of equal. When the ratios of resistance are balanced, the induced voltages across each horizontal/vertical segment of mesh 1120 and 1122 become equal, eliminating the differential induced voltage noise seen by circuits (e.g. chiplets) that are attached to 1120 and 1122 at any position on the panel. Thus, FIG. 11 can be understood to be an example backplane configuration wherein an imbalance of impedance ratios between two adjacent meshes can introduce noise at nodes that are positioned along or near the meshes.

Referring back to FIG. 10, in some examples and as described above, a backplane can be configured to balance resistance ratios to reduce and/or minimize noise. For example, signal traces 1022 can carry analog reference voltages including, but not limited to, references for current drivers of various light-emitting diodes (e.g., red, green, and blue), references for analog-to-digital converters, and any other internal or external references included in a touch and display device. The traces can have an associated impedance (e.g., resistance) that differs based on the parameters of trace routing. The power traces can have a vertical resistance 1026a representative of the resistance of a length of trace extending vertically (e.g., the vertical length around micro-driver 1004) and a horizontal resistance 1024a representative of the resistance of a length of trace extending horizontally on the backplane (e.g., the horizontal length around micro-driver 1004). The signal traces can have a vertical resistance 1026b representative of the resistance of a length of trace extending vertically and a horizontal resistance 1024b representative of the resistance of a length of trace extending horizontally on the backplane. In some examples, properties of the traces including, but not limited to thickness, length, width, and materials can be varied to control resistance. Although micro-driver 1004 is illustrated with a single respective power and signal trace routed around the perimeter, in some examples, the number of traces routed can be increased. For example, the micro-driver can have two (or more) power traces configured vertically on its left and right sides and two (or more) signal traces also configured horizontally above and below the micro-driver. Additionally or alternatively, in some examples, traces surrounding the micro-driver in the vertical direction can be different than the number of traces in the horizontal direction. For example, one power trace can extend on the left and right of a micro-driver, and two or more traces can extend above and below the micro-driver. It is understood that the disclosure is not limited to the examples described above, and that the signals carried by traces and/or the configuration (e.g., number of and/or distribution of) traces can be varied as desired. Accordingly, noise (e.g., differential mode noise) induced by an electromagnetic field can be reduced (and optionally minimized) by configuring the backplane traces and properties of the traces.

Figure 12A:
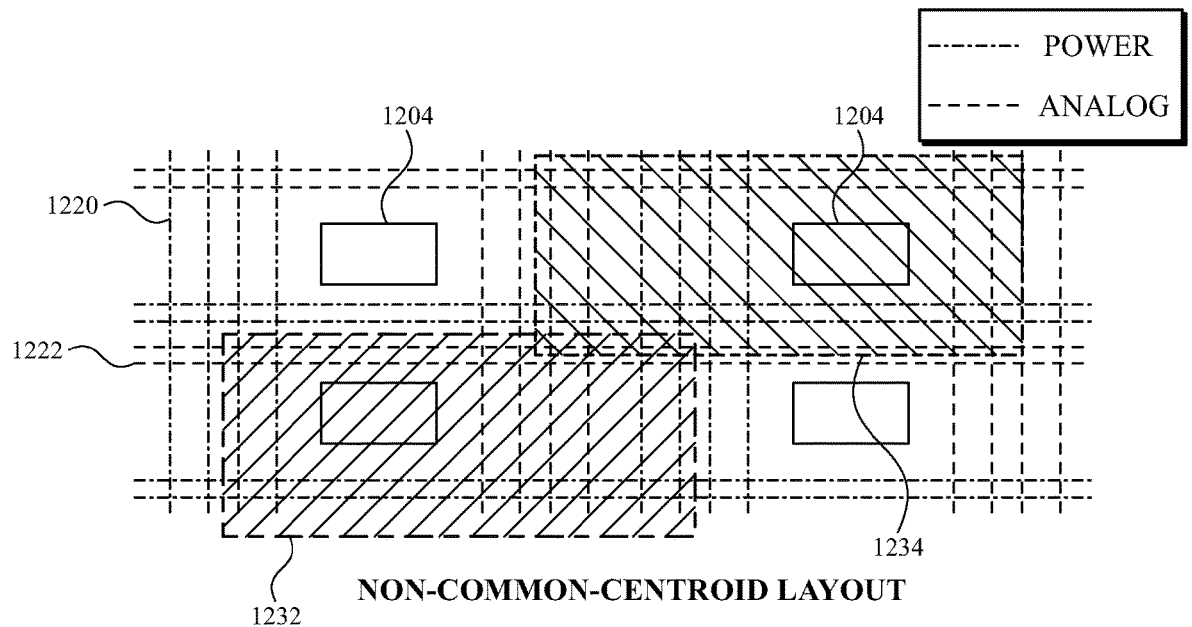
FIGS. 12A and 12B illustrate example configurations of backplane layouts according to examples of the disclosure.
Figure 12B:
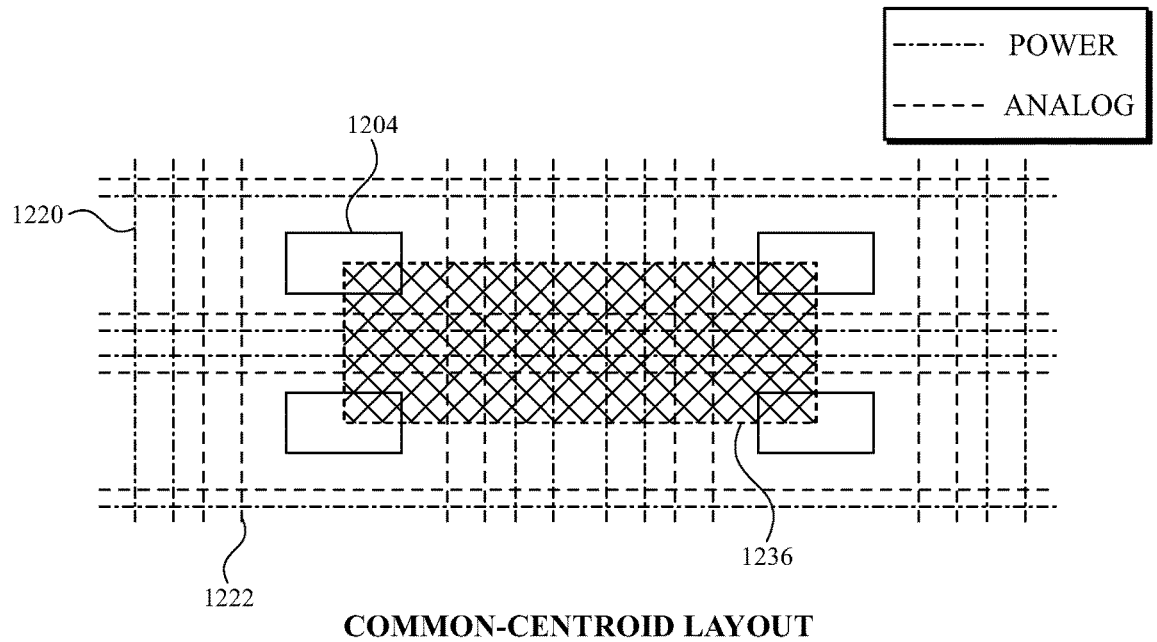

In some examples, due to the finite open loop area that remains in between traces, noise may be introduced into some analog lines despite matching the trace resistances as described above with respect to FIGS. 10-11. In some examples, to further reduce the induced noise, centroids for different analog signal nets can be aligned using common-centroid routing. The same mitigation can be applied to digital signal nets, as well. FIGS. 12A and 12B illustrate example configurations of backplane layouts according to examples of the disclosure. In some examples, the backplane can comprise two or more sets of signals (e.g., power signals, analog reference signals, etc.) configured to propagate across the backplane. Each set of signals (e.g., a mesh signal net) can have a center/centroid. As described herein, FIG. 12A illustrates an example configuration with non-overlapping centroids and FIG. 12B illustrates an example configuration with mostly or fully overlapping centroids (e.g., the geometric centers coincide or a distance between the geometric centers are with a threshold distance). Noise can be mitigated by configuring traces of the respective signals such that the center of a set of traces corresponding to each signal share a common center as described herein. This mitigation may be applied to signal pairs such as power pairs (e.g., VDD and VSS for analog or digital signals).

For example, traces 1220 can correspond to an analog power mesh net and traces 1222 can correspond to a second analog power mesh net. Although two analog power mesh nets are described, it is understood that these nets can correspond to other analog or digital signals or other pairs of signals). The traces 1220 and/or 1222 can be routed around a plurality of components 1204 (e.g., chiplets). As shown in FIG. 12A, the number and/or routing of traces for each net can define the location of a local geometric center of the layout. For example, centroid 1232 represents the geometric center of a plurality of traces 1220 (e.g., a first mesh net). Centroid 1234 similarly represents the geometric center corresponding to traces 1222 (e.g., a second mesh net).

Although the centroids are represented as rectangles in FIG. 12A, it should be understood that the centroid can be a different representation (e.g., a point or a different size or type of shape). As shown by FIG. 12B, a backplane can have a routing configuration of traces 1220 and 1222 such that the two nets have a shared, common centroid 1236. The routing configuration illustrated by FIG. 12B can, in some examples, reduce and/or minimize noise that couples to the backplane. For example, in the presence of an external electromagnetic field, the example backplane configuration shown in FIG. 12A comprises a greater area (e.g., open loop area) relative to the configuration shown in FIG. 12B, as shown by centroid 1232 and centroid 1234 to which the electromagnetic field can couple, inducing noise (e.g., a noise voltage). On the other hand, the example backplane configuration shown in FIG. 12B reduces and/or minimizes noise that can accrue (and potentially corrupt signals) by ensuring the centroids of traces 1220 and 1222 completely, or almost completely overlap (e.g., above a threshold amount of overlap).

Figure 14:
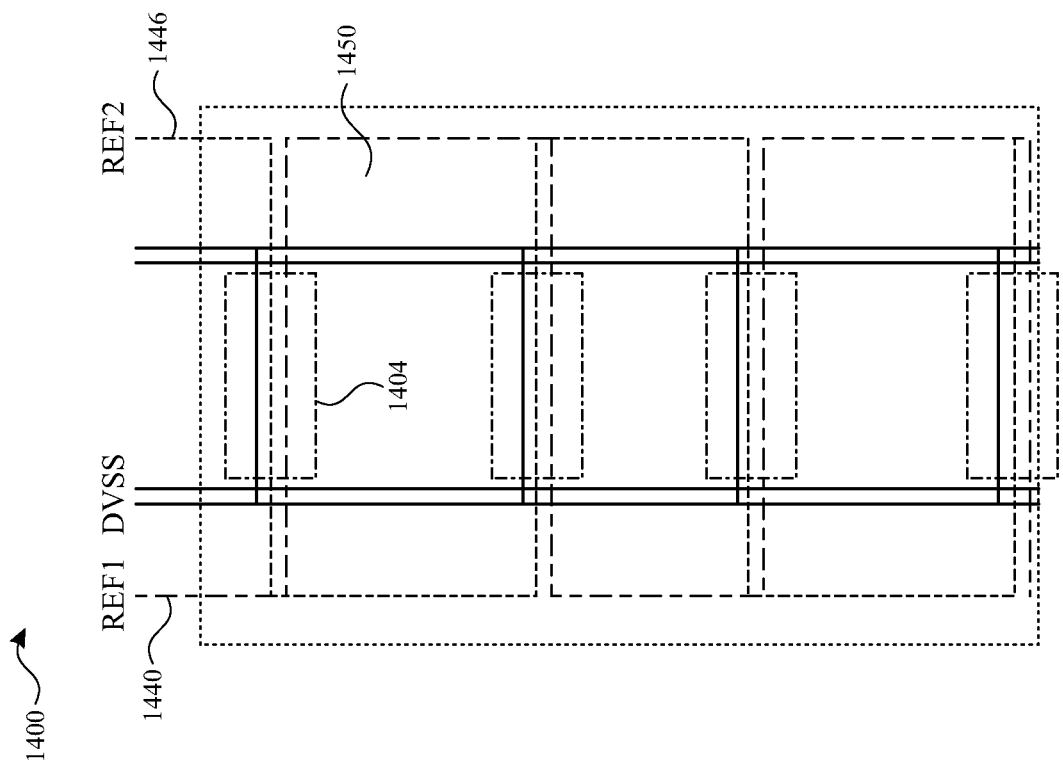
FIG. 14 illustrates an example configuration of a backplane configured to reduce coupled electromagnetic noise according to examples of the disclosure.
Figure 13A:
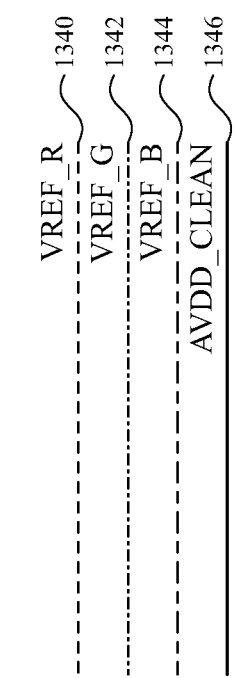
FIG. 13A illustrates a planar representation of a simplified backplane layout according to examples of the disclosure.
Figure 13B:
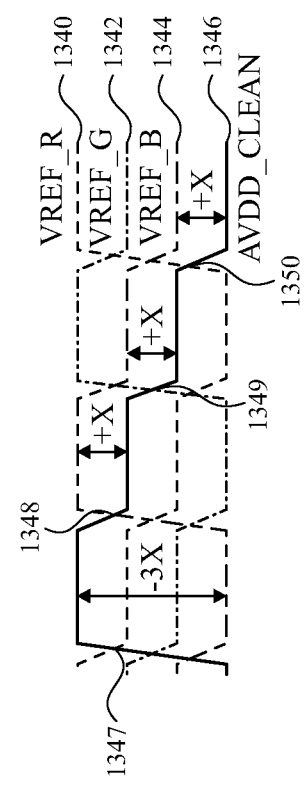
FIG. 13B illustrates a planar representation corresponding to the routing of a plurality of signals according to examples of the disclosure.

The common-centroid routing configuration of FIG. 12B may further reduce noise compared with the configuration of FIG. 12A, especially in the presence of a uniform magnetic field, but traces may still be susceptible to gradients in the field. In some examples, the relative position of some routing traces can be changed along the length of a column to cancel some or all of the open loop such that the noise is canceled in a flux integral for the magnetic field. The more frequently the trace locations are exchanged, the more robust the design can be to gradients in the magnetic field. FIGS. 13A, 13B, and 14 illustrate example configurations of a backplane configured to reduce coupled electromagnetic noise according to examples of the disclosure.

FIG. 13A illustrates a planar representation of a simplified backplane layout. The layout comprises the routing of a plurality of signal traces of the backplane according to examples of the disclosure. In some designs, signals in routing configuration 1300 can be arranged to run parallel, or almost parallel, along a column (or row), optionally in one layer. In some examples, the plurality of routing traces can include VREF_R 1340, VREF_G 1342, and VREF_B 1344, which can correspond to the red, blue and green reference voltages for light-emitting diode (or other display components) of a display. The plurality of routing traces can also include AVDD_CLEAN, which can correspond to an analog reference voltage, to which VREF_R 1340, VREF_G 1342, and VREF_B 1344 can be differentially referenced.

FIG. 13B illustrates a planar representation corresponding to routing of a plurality of signals configured to reduce and/or minimize noise. Unlike routing configuration 1300 in FIG. 13A, configuration 1301 in FIG. 13B corresponds to a layout that changes the relative position of the routing traces for the signals AVDD_CLEAN, VREF_R, VREF_G, and VREF_B. In some examples, the traces can be configured to cross over and/or under each other to adjust the relative position of the traces, optionally, in a sequence according to examples of the disclosure. For example, AVDD_CLEAN can be routed underneath VREF_R, VREF_G, and VREF_B at location 1347 between the top-most and bottom-most positions (e.g., corresponding to the planar locations of VREF_R and AVDD_CLEAN in FIG. 13A). Similarly, VREF_B can be routed underneath the remaining signals at location 1348, VREF_G can be routed underneath the remaining signals at location 1349, and VREF_R can be routed underneath the remaining signals at location 1350, respectively between the top-most and bottom-most positions. To facilitate the changes in position of the traces, in some examples, the backplane can include two or more layers for the routing traces (e.g., a circuit board with a plurality routing layers and vias to route a trace to a different layer with the backplane). Additionally, for each transition of a trace between a bottom-most and a top-most position, some or all of the remaining traces can also change positions. For example, at location 1347, routing traces VREF_R, VREF_G, and VREF_B each shift by one position. Likewise, VREF_R, VREF_G, and AVDD_CLEAN each shift by one position at location 1348, and similar shifts occur at locations 1349 and 1350). Although the configuration has been described with respect to the arrangement depicted by FIG. 13B, it is understood that this characterization is not limiting in any way. For example, the described layers and/or signals can vary in quantity, position, layout geometry, etc. as desired to achieve desired performance.

Configuration 1301 can be viewed as a twisted pair configuration in which the loop area between a respective reference voltage and the AVDD signal is designed to approximately cancel the magnetic field. For example, the relative position and separation of AVDD_CLEAN and VREF_B are represented in FIG. 13 by arrows showing a representative separation distance and a sign showing the relative position. As shown the open loop area along a portion of the routing shown can be approximately canceled because the open loop area of −3X for the leftmost segment cancels with the sum of +X from the remaining three segments of traces.

FIG. 14 illustrates another example configuration of a backplane configured to reduce coupled electromagnetic noise according to examples of the disclosure. The configuration 1400 shown can, in some examples, correspond to an alternate view of the configuration illustrated by FIG. 13B or a different implementation of twisted pair configuration for different reference and/or power signals. For example, the signal trace 1440 can correspond to VREF_R 1340 and signal trace 1446 can correspond to AVDD_CLEAN 1346. In some examples, the signal traces can be interwoven as a twisted pair using layers of a circuit board to reduce or eliminate noise induced by an electromagnetic field. Unlike configuration 1301 of FIG. 13B, however, the two traces can be routed around chiplets 1404 rather than twisting around a group of adjacent traces (e.g., on single side of a chiplet).

For example, signal trace 1440 and signal trace 1446 can be routed as shown, using interconnects (e.g., vias) to avoid intersection with other routing traces. Signal traces 1440 and 1446 can also be formed with a centroid that at least partially overlaps the centroid formed by DVSS traces 1450. As described with respect to FIG. 13B, the arrangement can be analogous to a twisted pair of cables, wherein the effective open loop area (e.g., remaining open loop area after cancelation) subject to coupling from an electromagnetic field can be reduced and/or minimized. For example, the routing traces can form loops with a net magnetic flux of the loops being zero or within a threshold of zero. Thus, noise caused by the electromagnetic field can be reduced by routing of the one or more signal traces. In some examples, if the traces carry signals that have a relationship (e.g., a differential pair), the traces can twist around each other, independent of the centroid of another signal (e.g., power traces such as DVSS). In some examples, the concept of a twisted pair of traces can be extended from the example of one pair shown in FIG. 14 to a grid of a plurality of traces or pairs of traces. Thus, whether the traces carry signals used by circuitry are a differential pair (e.g., the difference between trace 1440 and trace 1446) or are referenced to a voltage level (e.g., referenced to DVSS), the embodiments described above can minimize the noise that can otherwise corrupt analog signals that are caused by electromagnetic fields.

Figure 15:
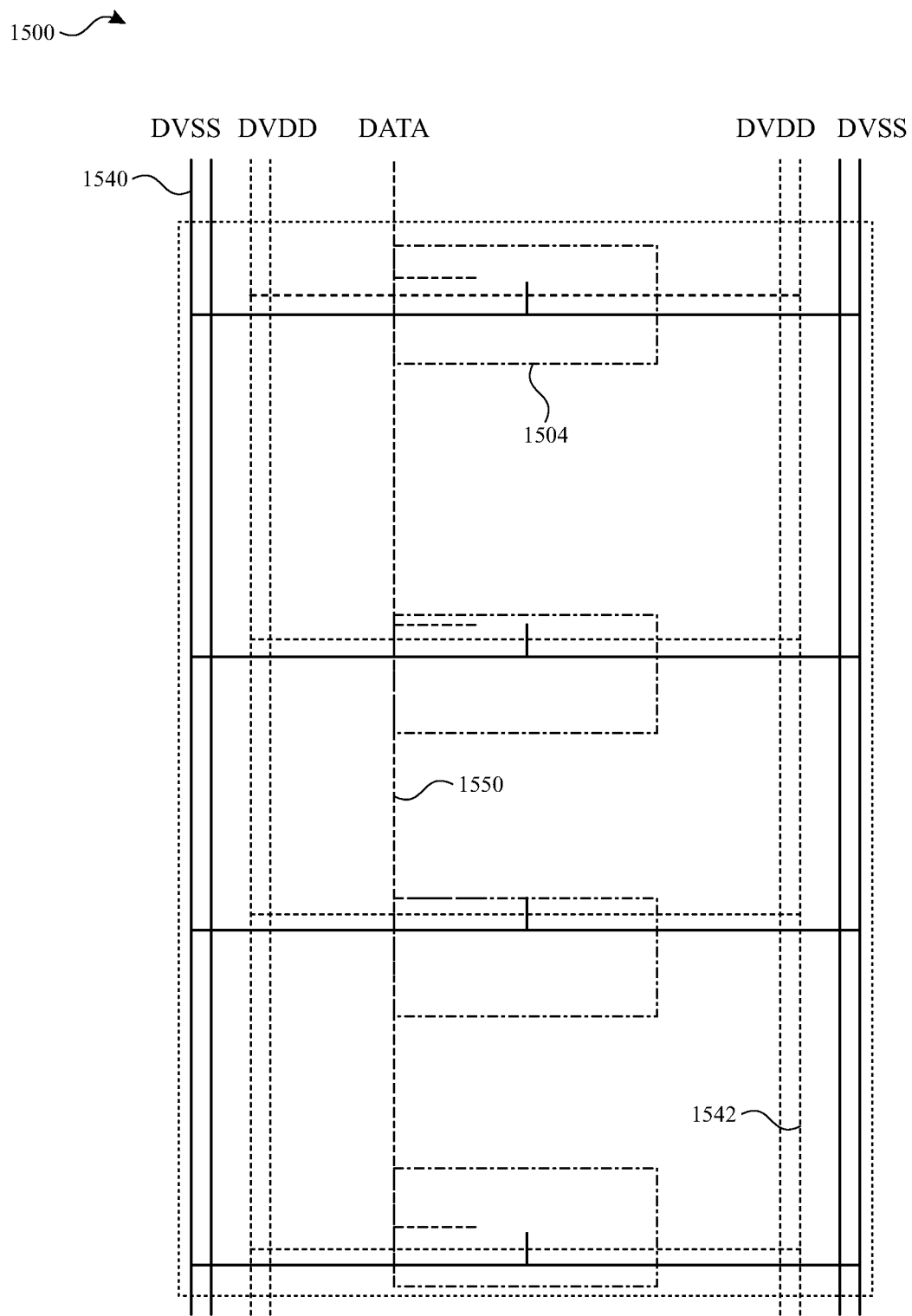
FIG. 15 illustrates an example configuration of a backplane with distributed supply routing according to examples of the disclosure.

In some examples, loop width can be reduced using distributed supply routing. FIG. 15 illustrates an example configuration 1500 of a backplane with distributed supply routing according to examples of the disclosure. For example, rather than using one routing trace for a power supply for a column of chiplets 1504, multiple routing traces can be used, which can reduce the overall distance between the power trace and a signal trace. FIG. 15 illustrates a column of chiplets 1504, with each chiplet supplied with representative supplies DVSS 1540, DVDD 1542 and a representative data line 1550. The supplies can be distributed supplies on both left and right sides of the chiplets. For example, DVSS 1540 and DVDD 1542 are each routed using a pair of traces on both sides of the chiplets 1504 (e.g., for a total of four vertical traces each) in a symmetric supply distribution. As described with respect to the FIG. 12B, the symmetric supply distribution can ensure that centroids of the DVSS and DVDD lines are aligned at least at the center of the column and are completely, or nearly completely overlapping. Additionally, the symmetric supply distribution reduces the distance between the data line 1550 and DVDD or DVSS, which can reduce the width of the loops formed between the data line 1550 and DVDD or DVSS. Without the symmetric supply routing, the distance between DVDD or DVSS and the data line can be larger, thereby increasing open loop area and noise interference. Thus decreasing open loop area can reduce coupled noise due to an electromagnetic field.

As described herein, in some examples the routing traces can also be constrained to avoid interference with a time varying magnetic field. For example, to reduce interference between traces and backplane of a touch system within the magnetic field, the routing for the touch nodes/chiplets can be designed to be routed primarily in areas of weaker induced electric field strength in the backplane, and with an orientation that reduces the distance that is parallel with the induced electric field. FIGS. 16 and 17 illustrate example routing configurations for routing touch nodes/chiplets to touch sensing circuitry (e.g., routing a touch signal along an analog signal or digital data line from a chiplet corresponding to a touch node to a touch controller or other processing circuitry) according to examples of the disclosure. FIG. 16, for example, shows a touch and display device 1600 with a representative touch node or corresponding touch node/chiplet 1692 routed to a termination node 1694 representing controller or processing circuitry for the touch node/chiplet. FIG. 16 also illustrates a simplified representation of an induced backplane electric field with outer region 1610 having a relatively high electric field and an inner region 1611 having relatively low electric field. FIG. 16 also includes a simplified representation of field vectors 1690 represent the direction of the electric field.

FIG. 16 shows a representative routing trace path 1680 for touch node/chiplet 1692 that is disposed within region 1610. In the example of FIG. 16, the routing trace path can include a first segment routing touch node/chiplet 1692 horizontally to the left edge of device 1600 and a second segment routing touch node/chiplet 1692 vertically to the bottom edge of the device. Because the first segment is parallel or nearly parallel to the electric field in region 1610 and the second segment is parallel or nearly parallel to the electric field in region 1610, substantial noise can accumulate along the signal path and interfere with the touch system.

In some examples, the induced noise can be reduced using a different routing path. For example, because induced noise is dependent on the angle between a line segment of a routing trace and the electric field vectors (e.g., solution to Faraday's law for a trace and backplane in a time varying magnetic field), the routing path can reduce distance of routing in region 1610 and to orient the routing trace to be orthogonal to (or at least non-parallel to) the electric field when possible. FIG. 17 illustrates an alternative routing path between touch node/chiplet 1792 and termination node 1794 of device 1700 (e.g., corresponding to touch node/chiplet 1692 and termination node 1694 of device 1600) that reduces interference. Routing trace path 1780 for touch node/chiplet 1792 can be designed to minimize trace length in region 1710 (e.g., corresponding to region 1610) and instead route the trace primarily in region 1711 (e.g., corresponding to region 1611). Additionally, the routing traces can be oriented perpendicular to or within a threshold of perpendicular to the field vectors 1790 when passing through the electric field, and especially region 1710. Routing trace path 1780 can reduce noise caused by electromagnetic fields as compared with routing trace path 1680. The routing trace path shown in FIG. 17 is understood to be exemplary in nature and not limiting in any way.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

Therefore, according to the above, some examples of the disclosure are directed to a device. The device can comprise: wireless communication circuitry including a coil configured to interact with magnetic fields; and a touch screen. The touch screen can comprise: touch and display circuitry including a controller and a plurality of chiplets, and a backplane in proximity to the wireless communication circuitry. The plurality of chiplets can include a first chiplet and a second chiplet. The first chiplet can include a first buffer circuit. The backplane can include a plurality of routing traces for routing signals between the controller and the plurality of chiplets including a first routing trace configured to route a first digital signal between the controller and a first pin of the first chiplet coupled to a first terminal of the first buffer circuit and a second routing trace configured to route the first digital signal between a second pin of the first chiplet coupled to a second terminal of the first buffer circuit and a first pin of the second chiplet. Additionally or alternatively to one or more of the examples disclosed above, in some examples, the first buffer circuit can comprise a Schmitt trigger circuit. Additionally or alternatively to one or more of the examples disclosed above, in some examples, the first buffer circuit can comprise an output touch data buffer circuit. The first routing trace can be further configured to route a digital touch data signal from the first chiplet to the controller. The digital touch data signal can be output from the first terminal of the first buffer circuit when configured in an output mode.

Additionally or alternatively to one or more of the examples disclosed above, in some examples, the first chiplet can comprise: a Schmitt trigger circuit. The first routing trace can be further configured to route the first digital signal to a third pin of the first chiplet coupled to a first terminal of the Schmitt trigger circuit. Additionally or alternatively to one or more of the examples disclosed above, in some examples, the first chiplet can comprise: an output touch data buffer circuit coupled to the third pin. The first routing trace can be configured to route a digital touch data signal from the third pin to the controller.

Additionally or alternatively to one or more of the examples disclosed above, in some examples, the first buffer circuit can be a bi-directional buffer. The first chiplet can further comprise: switching circuitry configured to control a direction of data flow for the bi-directional buffer.

Additionally or alternatively to one or more of the examples disclosed above, in some examples, the plurality of chiplets can be arranged in one or more columns along the backplane. The first chiplet and the second chiplet can be in a first column of the one or more columns.

Additionally or alternatively to one or more of the examples disclosed above, in some examples, the plurality of chiplets can further include a third chiplet. The second chiplet can include a second buffer circuit, a first terminal of the second buffer circuit coupled to the first pin of the second chiplet. The plurality of routing traces can further include a third routing trace configured to route the first digital signal between a second pin of the second chiplet coupled to a second terminal of the second buffer circuit and a first pin of the third chiplet. Additionally or alternatively to one or more of the examples disclosed above, in some examples, the plurality of chiplets can further includes a third chiplet and a fourth chiplet, the second chiplet between the first chiplet and the third chiplet and the third chiplet between the second chiplet and the fourth chiplet. The second chiplet can include a second buffer circuit and the third chiplet includes a third buffer circuit. The second routing trace can be further configured to route the first digital signal between the second pin of the first chiplet and a first pin of the third chiplet coupled to a first terminal of the third buffer circuit. The plurality of routing traces can further include a third routing trace, a fourth routing trace and a fifth routing trace, the third routing trace configured to route the first digital signal between a second pin of the third chiplet coupled to a second terminal of the third buffer circuit and a first pin of the fourth chiplet; the fourth routing trace configured to route a second digital signal between the controller and a second pin of the second chiplet coupled to a first terminal of the second buffer circuit; the fifth routing trace configured to route the second digital signal between a third pin of the second chiplet coupled to a second terminal of the second buffer circuit and a third pin of the third chiplet; and the fifth routing trace further configured to route the second digital signal between the third pin of the second chiplet coupled to the second terminal of the second buffer circuit and a second pin of the fourth chiplet.

Additionally or alternatively to one or more of the examples disclosed above, in some examples, the first chiplet can include a second buffer circuit. The plurality of routing traces can further include a third routing trace configured to route a second digital signal between the controller and a third pin of the first chiplet coupled to a first terminal of the second buffer circuit, and a fourth routing trace configured to route the second digital signal between a fourth pin of the first chiplet coupled to a second terminal of the second buffer circuit and a second pin of the second chiplet.

Additionally or alternatively to one or more of the examples disclosed above, in some examples, the plurality of routing traces can include a first mesh corresponding to a first signal net and a second mesh corresponding to a second signal net, the first mesh having a first ratio of sheet impedance along a first axis to impedance along a second axis for the first mesh, and the second mesh having a second ratio of sheet impedance along a first axis to impedance along a second axis for the second mesh. The first ratio and the second ratio can be equal or within a threshold of equal. Additionally or alternatively to one or more of the examples disclosed above, in some examples, the plurality of routing traces can include a first mesh corresponding to a first signal net and a second mesh corresponding to a second signal net, the first mesh having a first geometric center within a region of the backplane, and the second mesh having a second geometric center within the region of the backplane. The first geometric center and the second geometric center can coincide or a distance between the first geometric center and the second geometric center can be with a threshold.

Additionally or alternatively to one or more of the examples disclosed above, in some examples, the plurality of routing traces can include a third routing trace configured to route a first analog signal between the controller and the plurality of chiplets and a fourth routing trace configured to route a second analog signal between the controller and the plurality of chiplets. The third routing trace and fourth routing trace can be configured as a twisted pair of traces between two layers of metal, and the third routing trace and the fourth routing trace can form loops with a net magnetic flux of the loops being zero or within a threshold of zero.

Additionally or alternatively to one or more of the examples disclosed above, in some examples, the plurality of routing traces can include a third routing trace for an analog power supply. The third routing trace can include a first segment and a second segment that can be arranged symmetrically on two sides of the plurality of chiplets in of a column.

Additionally or alternatively to one or more of the examples disclosed above, in some examples, a conductive path connecting the first chiplet corresponding to a first touch node of the touch screen to the second chiplet corresponding to a second touch node of the touch screen can be configured to reduce trace length in a first region having a magnetic field strength above a first threshold and can be orientated perpendicular to, or within a second threshold of perpendicular to, the magnetic field lines within the first region.

Additionally or alternatively to one or more of the examples disclosed above, in some examples, the backplane can comprise one or more electrically separate backplane panels. Additionally or alternatively to one or more of the examples disclosed above, in some examples, the one or more electrically separate backplane panels can comprise a first backplane panel and a second backplane panel dividing the backplane in two (e.g., half). A first backbone column of the plurality of routing traces can be disposed at a first location at or within a first threshold distance of a midpoint of the first backplane panel and a second backbone column of the plurality of routing traces can be disposed at a second location at or within a second threshold distance of a midpoint of the second backplane panel.

Some examples of the disclosure are directed to an electronic device. The electronic device can comprise: wireless communication circuitry including a coil configured to interact with magnetic fields and a display. The display can comprise: display circuitry including a controller and a plurality of chiplets, and a backplane in proximity to the wireless communication circuitry. The plurality of chiplets can include a first chiplet and a second chiplet. The first chiplet can include a first buffer circuit. The backplane can include a plurality of routing traces for routing signals between the controller and the plurality of chiplets including a first routing trace configured to route a first digital signal between the controller and a first pin of the first chiplet coupled to a first terminal of the first buffer circuit and a second routing trace configured to route the first digital signal between a second pin of the first chiplet coupled to a second terminal of the first buffer circuit and a first pin of the second chiplet.

Additionally or alternatively to one or more of the examples disclosed above, in some examples, the backplane can comprise one or more electrically separate backplane panels.

Some examples of the disclosure are directed to an electronic device. The electronic device can comprise: an energy storage device; near field communication (NFC) circuitry including a coil configured to interact with magnetic fields; and a display. The display can comprise: display circuitry including a controller, a plurality of chiplets, and light emitting devices. The plurality of chiplets can include a first plurality of chiplets and a second plurality of chiplets, and the first plurality of chiplets can include a plurality of buffer circuits. The display can further include a backplane in proximity to the NFC circuitry. The backplane can include a plurality of routing traces for routing a plurality of signals between the controller and the plurality of chiplets. The first plurality of chiplets can be configured to receive the plurality of signals from the controller via a first plurality of the plurality of routing traces and to regenerate the plurality of signals using the plurality of buffer circuits. The second plurality of chiplets can be configured to receive the plurality of signals regenerated by the first plurality of chiplets using a second plurality of routing traces coupled between the first plurality of chiplets and the second plurality of chiplets.

The invention claimed is:

1. A device comprising:
 a touch screen, wherein the touch screen comprises:
  touch and display circuitry including a controller and a plurality of chiplets, wherein the plurality of chiplets includes a first chiplet and a second chiplet, and wherein the first chiplet includes a first buffer circuit; and
  a backplane including a plurality of routing traces for routing signals between the controller and the plurality of chiplets including a first routing trace configured to route a first digital signal between the controller and a first pin of the first chiplet coupled to a first terminal of the first buffer circuit and a second routing trace configured to route the first digital signal between a second pin of the first chiplet coupled to a second terminal of the first buffer circuit and a first pin of the second chiplet.

2. The device of claim 1, wherein the first buffer circuit comprises a Schmitt trigger circuit.

3. The device of claim 1, wherein:
 the first buffer circuit comprises an output touch data buffer circuit;
 the first routing trace is further configured to route a digital touch data signal from the first chiplet to the controller; and
 the digital touch data signal is output from the first terminal of the first buffer circuit when configured in an output mode.

4. The device of claim 1, wherein:
 the first chiplet comprises a Schmitt trigger circuit; and
 the first routing trace is further configured to route the first digital signal to a third pin of the first chiplet coupled to a first terminal of the Schmitt trigger circuit.

5. The device of claim 4, wherein:
 the first chiplet comprises an output touch data buffer circuit coupled to the third pin; and
 the first routing trace is configured to route a digital touch data signal from the third pin to the controller.

6. The device of claim 1, wherein the first buffer circuit is a bi-directional buffer, the first chiplet further comprising:
 switching circuitry configured to control a direction of data flow for the bi-directional buffer.

7. The device of claim 1, wherein the plurality of chiplets are arranged in one or more columns along the backplane, and wherein the first chiplet and the second chiplet are in a first column of the one or more columns.

8. The device of claim 1, wherein:
 the plurality of chiplets further includes a third chiplet;
 the second chiplet includes a second buffer circuit, a first terminal of the second buffer circuit coupled to the first pin of the second chiplet;
 the plurality of routing traces further includes a third routing trace configured to route the first digital signal between a second pin of the second chiplet coupled to a second terminal of the second buffer circuit and a first pin of the third chiplet.

9. The device of claim 1, wherein:
 the plurality of chiplets further includes a third chiplet and a fourth chiplet, the second chiplet between the first chiplet and the third chiplet and the third chiplet between the second chiplet and the fourth chiplet;
 the second chiplet includes a second buffer circuit;
 the third chiplet includes a third buffer circuit;
 the second routing trace further configured to route the first digital signal between the second pin of the first chiplet and a first pin of the third chiplet coupled to a first terminal of the third buffer circuit;
 the plurality of routing traces further includes a third routing trace, a fourth routing trace and a fifth routing trace;
 the third routing trace configured to route the first digital signal between a second pin of the third chiplet coupled to a second terminal of the third buffer circuit and a first pin of the fourth chiplet;
 the fourth routing trace configured to route a second digital signal between the controller and a second pin of the second chiplet coupled to a first terminal of the second buffer circuit;
 the fifth routing trace configured to route the second digital signal between a third pin of the second chiplet coupled to a second terminal of the second buffer circuit and a third pin of the third chiplet; and
 the fifth routing trace further configured to route the second digital signal between the third pin of the second chiplet coupled to the second terminal of the second buffer circuit and a second pin of the fourth chiplet.

10. The device of claim 1, wherein:
 the first chiplet includes a second buffer circuit;
 the plurality of routing traces further includes a third routing trace configured to route a second digital signal between the controller and a third pin of the first chiplet coupled to a first terminal of the second buffer circuit and a fourth routing trace configured to route the second digital signal between a fourth pin of the first chiplet coupled to a second terminal of the second buffer circuit and a second pin of the second chiplet.

11. The device of claim 1, wherein:
the plurality of routing traces includes a first mesh corresponding to a first signal net and a second mesh corresponding to a second signal net;
the first mesh has a first ratio of sheet impedance along a first axis to impedance along a second axis for the first mesh;
the second mesh has a second ratio of sheet impedance along a first axis to impedance along a second axis for the second mesh; and
the first ratio and the second ratio are equal or within a threshold of equal.

12. The device of claim 1, wherein:
the plurality of routing traces includes a first mesh corresponding to a first signal net and a second mesh corresponding to a second signal net;
the first mesh has a first geometric center within a region of the backplane;
the second mesh has a second geometric center within the region of the backplane; and
the first geometric center and the second geometric center coincide or a distance between the first geometric center and the second geometric center are with a threshold.

13. The device of claim 1, wherein:
the plurality of routing traces includes a third routing trace configured to route a first analog signal between the controller and the plurality of chiplets and a fourth routing trace configured to route a second analog signal between the controller and the plurality of chiplets;
the third routing trace and fourth routing trace are configured as a twisted pair of traces between two layers of metal; and
the third routing trace and the fourth routing trace form loops with a net magnetic flux of the loops being zero or within a threshold of zero.

14. The device of claim 1, wherein the plurality of routing traces includes a third routing trace for an analog power supply, wherein the third routing trace includes a first segment and a second segment that are arranged symmetrically on two sides of the plurality of chiplets in of a column.

15. The device of claim 1, wherein a conductive path connecting the first chiplet corresponding to a first touch node of the touch screen to the second chiplet corresponding to a second touch node of the touch screen is configured to reduce trace length in a first region having a magnetic field strength above a first threshold and is orientated perpendicular to, or within a second threshold of perpendicular to, magnetic field lines within the first region.

16. The device of claim 1, wherein the backplane comprises one or more electrically separate backplane panels.

17. The device of claim 16, wherein the one or more electrically separate backplane panels comprises a first backplane panel and a second backplane panel dividing the backplane in half, and wherein a first backbone column of the plurality of routing traces is disposed at a first location at or within a first threshold distance of a midpoint of the first backplane panel and a second backbone column of the plurality of routing traces is disposed at a second location at or within a second threshold distance of a midpoint of the second backplane panel.

18. The device of claim 1, further comprising:
wireless communication circuitry including a coil configured to interact with magnetic fields, wherein the backplane is in proximity to wireless communication circuitry.

19. An electronic device comprising:
wireless communication circuitry including a coil configured to interact with magnetic fields; and
a display, wherein the display comprises:
display circuitry including a controller and a plurality of chiplets, wherein the plurality of chiplets includes a first chiplet and a second chiplet, and wherein the first chiplet includes a first buffer circuit; and
a backplane in proximity to the wireless communication circuitry, the backplane including a plurality of routing traces for routing signals between the controller and the plurality of chiplets including a first routing trace configured to route a first digital signal between the controller and a first pin of the first chiplet coupled to a first terminal of the first buffer circuit and a second routing trace configured to route the first digital signal between a second pin of the first chiplet coupled to a second terminal of the first buffer circuit and a first pin of the second chiplet.

20. An electronic device comprising:
an energy storage device;
near field communication (NFC) circuitry including a coil configured to interact with magnetic fields; and
a display, wherein the display comprises:
display circuitry including a controller, a plurality of chiplets, and light emitting devices, wherein the plurality of chiplets includes a first plurality of chiplets and a second plurality of chiplets, and wherein the first plurality of chiplets includes a plurality of buffer circuits; and
a backplane in proximity to the NFC circuitry, the backplane including a plurality of routing traces for routing a plurality of signals between the controller and the plurality of chiplets;
wherein:
the first plurality of chiplets are configured to receive the plurality of signals from the controller via a first plurality of the plurality of routing traces and to regenerate the plurality of signals using the plurality of buffer circuits; and
the second plurality of chiplets are configured to receive the plurality of signals regenerated by the first plurality of chiplets using a second plurality of routing traces coupled between the first plurality of chiplets and the second plurality of chiplets.

21. The electronic device of claim 20, wherein the backplane comprises a plurality of electrically separate backplane panels.

* * * * *